United States Patent
Saito

(10) Patent No.: US 11,430,429 B2
(45) Date of Patent: Aug. 30, 2022

(54) INFORMATION PROCESSING APPARATUS AND INFORMATION PROCESSING METHOD

(71) Applicant: SONY CORPORATION, Tokyo (JP)

(72) Inventor: Mari Saito, Kanagawa (JP)

(73) Assignee: SONY CORPORATION, Tokyo (JP)

(*) Notice: Subject to any disclaimer, the term of this patent is extended or adjusted under 35 U.S.C. 154(b) by 89 days.

(21) Appl. No.: 16/960,834

(22) PCT Filed: Oct. 29, 2018

(86) PCT No.: PCT/JP2018/040151
§ 371 (c)(1),
(2) Date: Jul. 8, 2020

(87) PCT Pub. No.: WO2019/146199
PCT Pub. Date: Aug. 1, 2019

(65) Prior Publication Data
US 2020/0357385 A1    Nov. 12, 2020

(30) Foreign Application Priority Data
Jan. 23, 2018    (JP) .............................. JP2018-009150

(51) Int. Cl.
*G10L 15/07* (2013.01)
*G10L 13/04* (2013.01)
*G10L 15/22* (2006.01)

(52) U.S. Cl.
CPC .............. *G10L 15/07* (2013.01); *G10L 13/04* (2013.01); *G10L 15/22* (2013.01); *G10L 2015/227* (2013.01)

(58) Field of Classification Search
CPC ......... G10L 15/07; G10L 13/04; G10L 15/22; G10L 2015/227
(Continued)

(56) References Cited

U.S. PATENT DOCUMENTS

2004/0215463 A1   10/2004   Aoyama et al.
2006/0234759 A1*   10/2006   Kim .................. H04M 1/72448
                                                                              455/550.1
(Continued)

FOREIGN PATENT DOCUMENTS

EP        3264258 A1    1/2018
JP     2003-189148 A    7/2003
(Continued)

OTHER PUBLICATIONS

Krizhevsky, et al., "ImageNet Classification with Deep Convolutional Neural Network", Advances in neural Information processing systems, vol. 25, No. 2, Jan. 2012, 09 pages.
(Continued)

*Primary Examiner* — Bharatkumar S Shah
(74) *Attorney, Agent, or Firm* — Chip Law Group

(57) ABSTRACT

To more smoothly communicate with a user, provided is an information processing apparatus including an output control unit that controls information presentation to a user, in which, in a case where a specific expression in a group including the user is applicable regarding content of information to be presented, the output control unit causes the information presentation including the specific expression to be executed using at least one of a sound or an image. Furthermore, provided is an information processing apparatus including a learning unit that learns a recognition target and a linguistic expression regarding the recognition target in association with each other, in which the linguistic expression includes a specific expression in a group including a user, and the learning unit learns the specific expression on the basis of at least one of a collected sound or a collected image.

20 Claims, 14 Drawing Sheets

(58) Field of Classification Search
USPC .......................................................... 704/275
See application file for complete search history.

(56) References Cited

U.S. PATENT DOCUMENTS

| | | |
|---|---|---|
| 2010/0332231 A1 | 12/2010 | Nakano et al. |
| 2011/0115807 A1* | 5/2011 | Kim .................. G09G 5/02 |
| | | 345/589 |
| 2012/0206603 A1* | 8/2012 | Rekimto .............. G06V 40/175 |
| | | 348/E7.085 |
| 2017/0337921 A1 | 11/2017 | Aoyama et al. |

FOREIGN PATENT DOCUMENTS

| | | |
|---|---|---|
| JP | 2004-252111 A | 9/2004 |
| JP | 2010-282199 A | 12/2010 |
| WO | 2016/136062 A1 | 9/2016 |

OTHER PUBLICATIONS

International Search Report and Written Opinion of PCT Application No. PCT/JP2018/040151, dated Jan. 15, 2019, 08 pages of ISRWO.

\* cited by examiner

FIG. 5

| GENERAL EXPRESSION | SPECIFIC EXPRESSION | TARGET USER | NUMBER OF TIMES | IMAGE |
|---|---|---|---|---|
| DISH | CURRY DISH | AAA, BBB, CCC | 5 | image1 |
| YUTA | YU-CHAN | AAA, BBB | — | image2 |
| REMOTE CONTROLLER | REMOTE | AAA, BBB | — | image3 |
| REMOTE CONTROLLER | PIPPI | CCC | — | image3 |

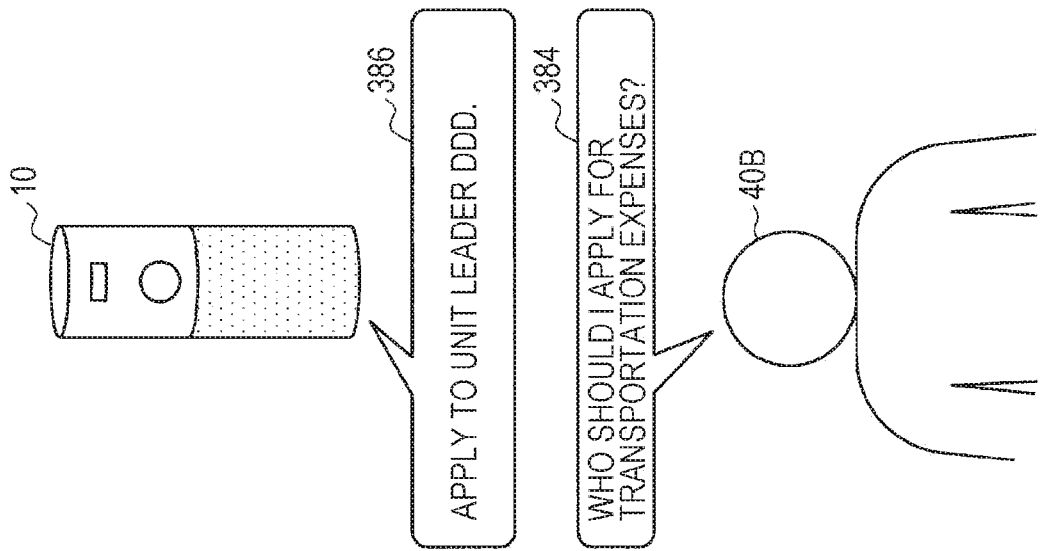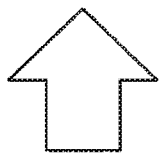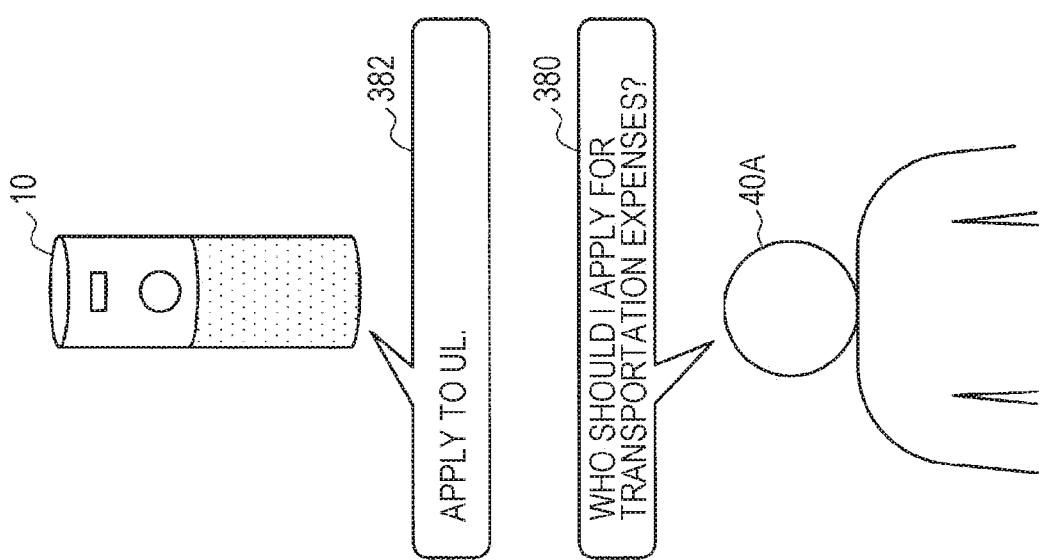
FIG. 6

FIG. 10
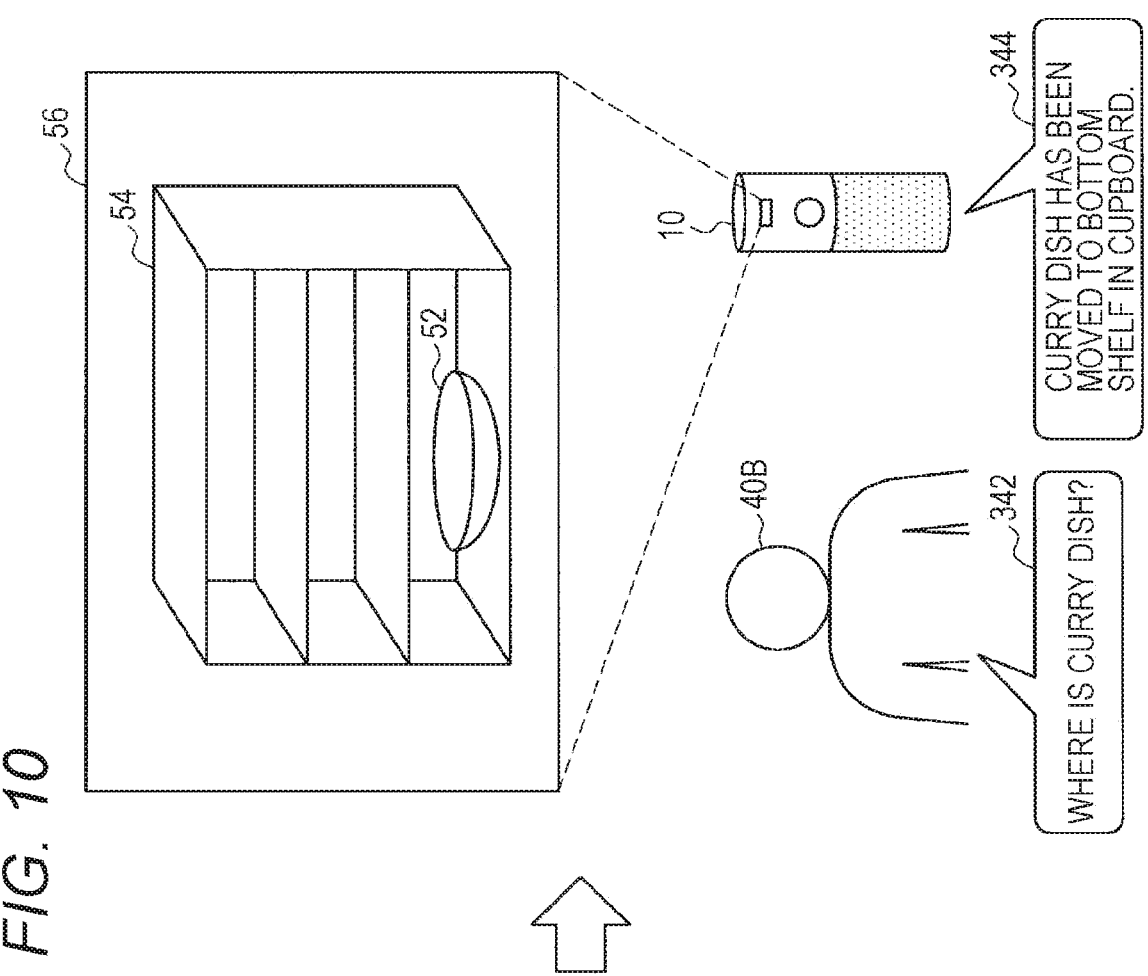
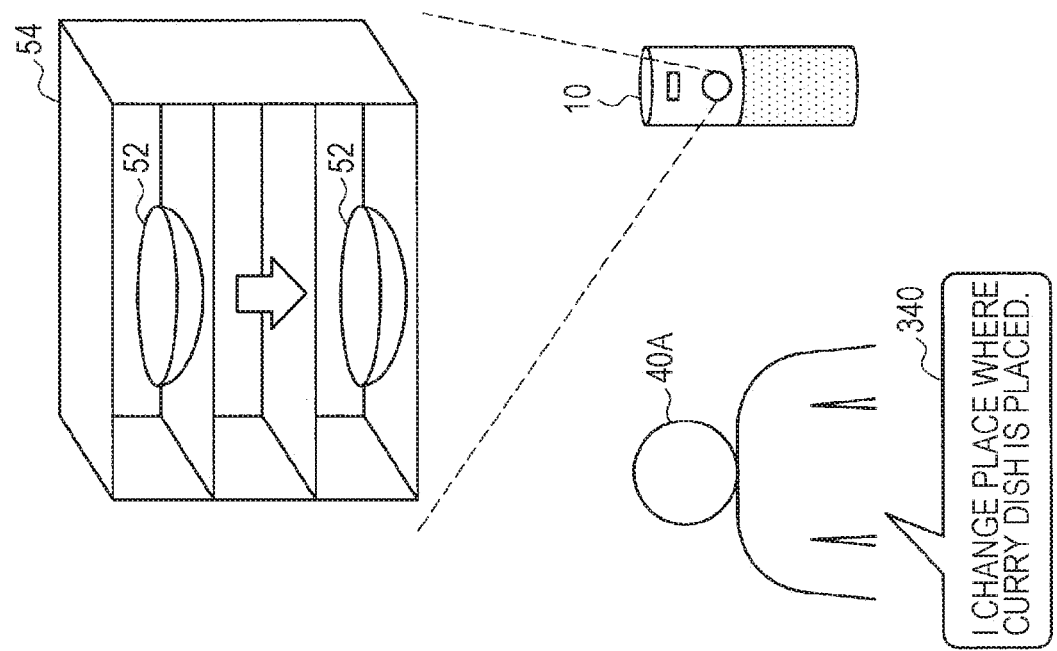

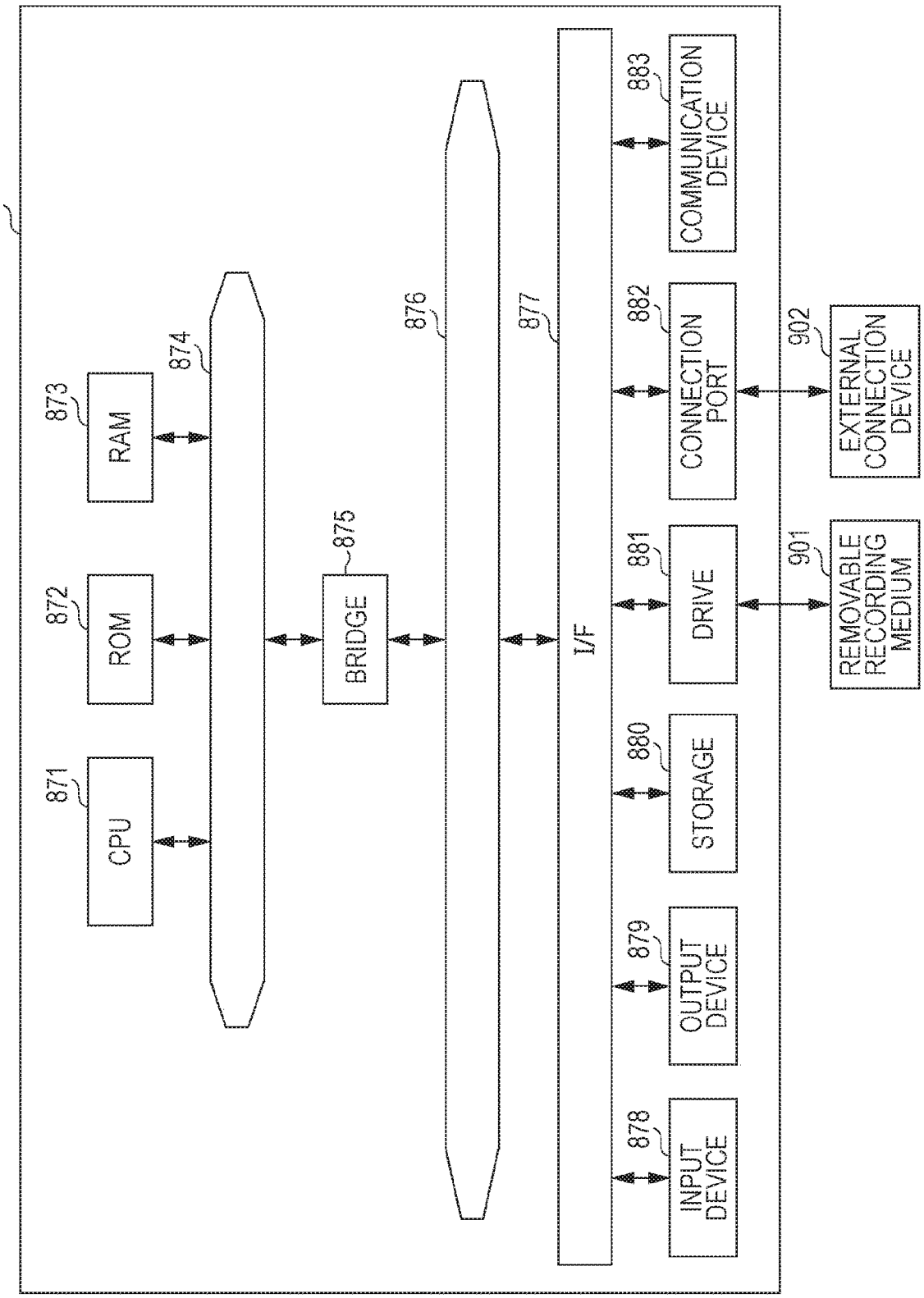

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/040151 filed on Oct. 29, 2018, which claims priority benefit of Japanese Patent Application No. JP 2018-009150 filed in the Japan Patent Office on Jan. 23, 2018. Each of the above-referenced applications is hereby incorporated herein by reference in its entirety.

TECHNICAL FIELD

The present disclosure relates to an information processing apparatus and an information processing method.

BACKGROUND ART

In recent years, various apparatuses for presenting information to users using sound or visual information have become widespread. Furthermore, many technologies for improving user's convenience regarding information presentation as described above have been developed.

In connection with the above-described technologies, Non-Patent Document 1 below discloses a technology of recognizing an object included in an image using general object recognition, acquiring a general name (hereinafter also referred to as a general expression) of the object, and expressing the object using the general expression, for example. A terminal equipped with the above-described general object recognition function can recognize an object by the general object recognition and express the recognized object using the general expression.

CITATION LIST

Non-Patent Document

Non-Patent Document 1: Alex Krizhevsky and 2 others, "ImageNet Classification with Deep Convolutional Neural Network", [online], Dec. 4, 2012, Neural Information Processing Systems, [Search Jan. 19, 2018], Internet (URL: https://papers.nips.cc/paper/4824-imagenet-classification-with-deep-convolutional-neural-networks.pdf)

SUMMARY OF THE INVENTION

Problems to be Solved by the Invention

However, the same object may be expressed differently (hereinafter also referred to as a specific expression) from the general expression depending on an individual or a group (for example, a family). The technology described in Non-Patent Document 1 can acquire, use, and recognize the general expression of the object by the general object recognition but cannot acquire, use, and recognize the specific expression of the object.

Therefore, the present disclosure proposes new and improved information processing apparatus and information processing method capable of more smoothly communicating with a user.

Solutions to Problems

According to the present disclosure, provided is an information processing apparatus including an output control unit configured to control information presentation to a user, in which, in a case where a specific expression in a group including the user is applicable regarding content of information to be presented, the output control unit causes the information presentation including the specific expression to be executed using at least one of a sound or an image.

Furthermore, according to the present disclosure, provided is an information processing apparatus including a learning unit configured to learn a recognition target and a linguistic expression regarding the recognition target in association with each other, in which the linguistic expression includes a specific expression in a group including a user, and the learning unit learns the specific expression on the basis of at least one of a collected sound or a collected image.

Furthermore, according to the present disclosure, provided is an information processing method executed by a processor, the method including controlling information presentation to a user, and in a case where a specific expression in a group including the user is applicable regarding content of information to be presented, causing the information presentation including the specific expression to be executed using at least one of a sound or an image.

Furthermore, according to the present disclosure, provided is an information processing method executed by a processor, the method including learning a recognition target and a linguistic expression regarding the recognition target in association with each other, the linguistic expression including a specific expression in a group including a user, and learning the specific expression on the basis of at least one of a collected sound or a collected image.

Effects of the Invention

According to the above-described present disclosure, communication with a user can be more smoothly performed.

Note that the above-described effect is not necessarily limited, and any of effects described in the present specification or other effects that can be grasped from the present specification may be exerted in addition to or in place of the above-described effect.

BRIEF DESCRIPTION OF DRAWINGS

FIG. 5 is an explanatory diagram illustrating a configuration example of a specific expression DB according to the embodiment.

FIG. 6 is an explanatory diagram illustrating an example of information presentation to a user not belonging to a group according to the embodiment.

FIG. 10 is an explanatory diagram illustrating a learning example and an application example of a specific expression based on a sound and an image presented by a user according to the embodiment.

FIG. 14 is an explanatory diagram illustrating a hardware configuration example according to the embodiment of the present disclosure.

MODE FOR CARRYING OUT THE INVENTION

Figure 1:
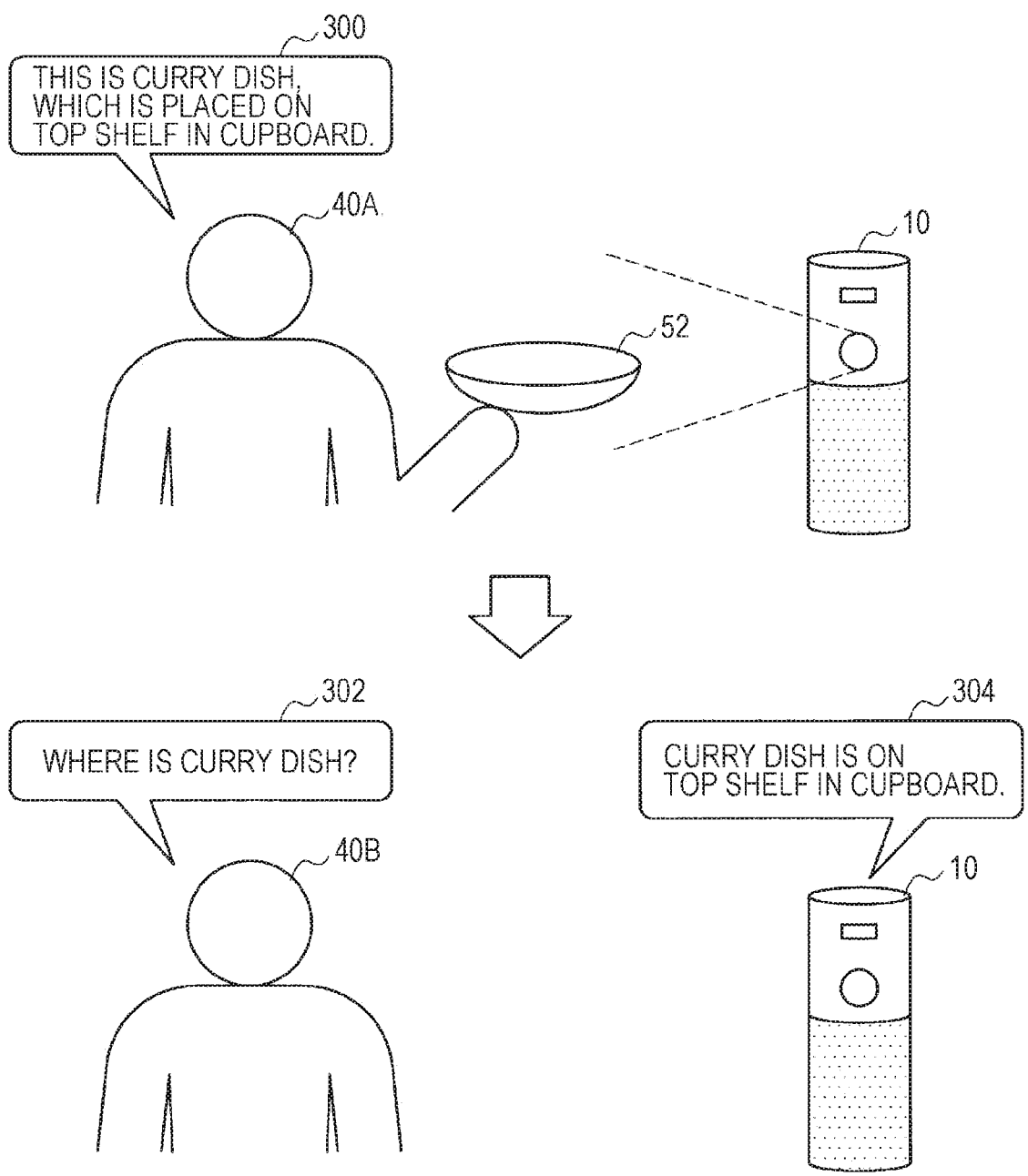
FIG. 1 is an explanatory diagram illustrating an overview of an embodiment of the present disclosure.

A favorable embodiment of the present disclosure will be described in detail with reference to the appended drawings. Note that, in the present specification and drawings, redundant description of configuration elements having substantially the same functional configuration is omitted by providing the same sign.

Note that the description will be given in the following order.
1. Embodiment of Present Disclosure
1.1. Overview
1.2. System Configuration Example
1.3. Functional Configuration Example of Information Processing Terminal 10
1.4. Functional Configuration Example of Information Processing Server 20
1.5. Operation Example
2. Modification
3. Hardware Configuration Example
4. Conclusion 1. Embodiment of Present Disclosure 1.1. Overview In recent years, various apparatuses for presenting information to a user using a technique of machine learning or the like have become widespread. Examples of such apparatuses include an agent device that presents information to the user using sound utterances or visual information. The agent device can respond with response information and the like to a user's inquiry, for example, by outputting a sound utterance, displaying visual information, or the like.

At this time, the response information output by the agent device can be presented on the basis of information learned by the agent device. For example, the agent device learns by recognizing a recognition target such as an object by general object recognition and acquiring a general name (hereinafter also referred to as a general expression) of the recognition target. Then, the agent device can output a sound utterance, display visual information, or the like using the learned general expression.

However, the same object may be expressed differently (hereinafter also referred to as a specific expression) from the general expression depending on an individual or a group (for example, a family). However, the above-described agent device is assumed only to learn a general expression. Therefore, in a case where the specific expression is included in input information from a user, the agent device cannot recognize the specific expression and is assumed not to present appropriate information to the user.

An information processing apparatus and an information processing method according to an embodiment of the present disclosure are conceived focusing on the above points, and enable more smooth communication with a user by learning a recognition target and a specific expression for the recognition target in association with each other. For this purpose, the information processing apparatus for implementing the information processing method according to the present embodiment is characterized in controlling output of response information using the specific expression on the basis of input information.

Here, the specific expression is an expression different from the general expression. For example, the general expression for dishes used for meals is "dish". In a case where the dish is used for serving curry, the dish may be called "curry dish" in some homes. The expression "curry dish" corresponds to the specific expression.

Note that the specific expression is not limited to a name of an object such as the above-described dish. For example, the specific expression may be an adjective expression indicating a property, a state, or the like of an object or the like, in addition to the name of an object or the like. Furthermore, the specific expression may be an operation expression indicating an operation of an object or the like. Furthermore, the specific expression may be a dialect. As described above, since the expressions included in the specific expressions are not limited to names, an information processing terminal 10 can enlarge the range of communication with a user 40.

FIG. 1 is an explanatory diagram illustrating an overview of an embodiment of the present disclosure. The upper part in FIG. 1 illustrates an example of when the information processing terminal 10 learns a specific expression. In the example illustrated in the upper part in FIG. 1, a user 40A presents a dish 52 to the information processing terminal 10. At the same time, the user 40A gives an utterance to the information processing terminal 10 such as "This is a curry dish, which is placed on a top shelf in a cupboard" (user utterance 300).

In response to the above-described action of the user, the information processing terminal 10 acquires an image of the dish 52 presented by the user 40A as input information and analyzes the image by the general object recognition, thereby recognizing that the dish 52 is "dish" in general expression. Furthermore, the information processing terminal 10 acquires a sound of the user utterance 300 as input information and analyzes the sound, thereby acquiring "curry dish" as the specific expression. Then, the information processing terminal 10 learns by associating the dish 52 recognized as the "dish" with the acquired specific expression "curry dish". Note that the information processing terminal 10 may learn information indicating a location of the dish 52 of the user utterance 300 of "the curry dish is placed on a top shelf in a cupboard" in association with the specific expression of the dish 52.

Meanwhile, the lower part in FIG. 1 illustrates an example of when the information processing terminal 10 applies a specific expression as presented information. In the example illustrated in the lower part in FIG. 1, a user 40B gives an utterance of "Where is a curry dish?" (user utterance 302) to the information processing terminal 10. When the user 40B gives the utterance, the information processing terminal 10 acquires the sound of the user utterance 302 as input information. Then, the information processing terminal 10 analyzes the sound of the user utterance 302, thereby recognizing that the user is inquiring about the location of a curry dish. At the same time, the information processing terminal 10 checks whether or not the user utterance 302 includes a specific expression.

Note that, in a case where the sound includes a specific expression, the information processing terminal 10 presents information applying the specific expression. In a case where the user 40 uses the specific expression, which indicates that the user understands the specific expression, and the specific expression is assumed to be familiar or easy to understand for the user 40.

Furthermore, when the information processing terminal 10 uses a general expression although the user 40 uses the specific expression, the user 40 may feel a gap in the conversation or strongly feels that the user 40 talks with a machine. Meanwhile, when the information processing terminal 10 uses a similar specific expression in accordance with the user 40 while the user 40 uses the specific expression, the user 40 can feel humanness from the information processing terminal 10. Therefore, the information processing terminal 10 presents information using the specific expression, so that the effects that the user 40 can more intuitively understand the presented information, the user 40 feels more familiar with the information processing terminal 10, and the like are expected.

Furthermore, in the case where the sound does not includes a specific expression, the information processing terminal 10 presents information using a general expression without using a specific expression. In the case of the example illustrated in FIG. 1, since the user utterance 302 includes the specific expression of "curry dish", the information processing terminal 10 presents information of "The curry dish is placed on the top shelf in the cupboard" (terminal utterance 304) using the specific expression.

1.2. System Configuration Example

Figure 2:
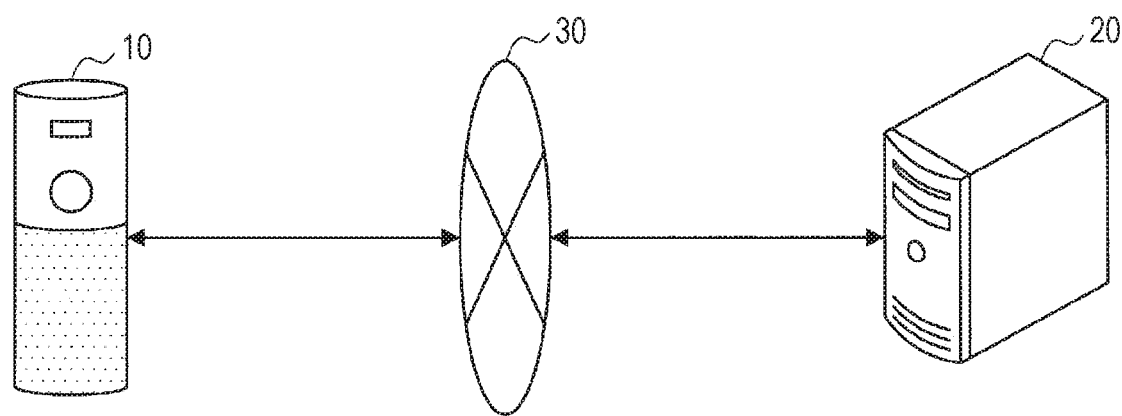
FIG. 2 is a block diagram illustrating a configuration example of an information processing system according to the embodiment.

Next, a configuration example of an information processing system according to the present embodiment will be described with reference to FIG. 2. FIG. 2 is a block diagram illustrating a configuration example of an information processing system according to the present embodiment. Referring to FIG. 2, the information processing system according to the present embodiment includes the information processing terminal 10 and an information processing server 20. Furthermore, the information processing terminal 10 and the information processing server 20 are connected so as to communicate with each other via a network 30.

(1) Information Processing Terminal 10

The information processing terminal 10 according to the present embodiment is an information processing apparatus that outputs response information using sound or visual information to a user on the basis of control by the information processing server 20. The information processing terminal 10 according to the present embodiment is characterized in outputting response information on the basis of output information to which a specific expression is applied by the information processing server 20.

The information processing terminal 10 according to the present embodiment can be implemented as various devices having a function to output sound and visual information. The information processing terminal 10 according to the present embodiment may be, for example, a mobile phone, a smartphone, a tablet, a wearable device, a general-purpose computer, a stationary-type or an autonomous mobile-type dedicated device, and the like.

Furthermore, the information processing terminal 10 according to the present embodiment has a function to collect various types of information regarding the user and a surrounding environment. The information processing terminal 10 collects, for example, sound information including a user's utterance, input sentence input by the user by device operation, image information obtained by capturing the user and surroundings, and other various types of sensor information, and transmits the information to the information processing server 20.

(2) Information Processing Server 20

The information processing server 20 according to the present embodiment is an information processing apparatus that learns a specific expression on the basis of input information. For example, the information processing server 20 according to the present embodiment is characterized in learning a specific expression of a recognition target on the basis of input information. Specifically, the information processing server 20 according to the present embodiment learns the recognition target and a linguistic expression regarding the recognition target in association with each other on the basis of input information that is at least one of collected sound or image. Note that the linguistic expression includes a specific expression in a group including the user.

Furthermore, the information processing server 20 according to the present embodiment is also an information processing apparatus that controls output of response information to the user on the basis of input information. Then, in a case of being capable of presenting response information using a specific expression to a group to which the user belongs, the information processing server 20 controls output of the response information using the specific expression using at least one of the sound or image.

(3) Network 30

The network 30 has a function to connect the information processing terminal 10 and the information processing server 20. The network 30 may include a public network such as the Internet, a telephone network, and a satellite network, various local area networks (LAN) including Ethernet (registered trademark), a wide area network (WAN), and the like. Furthermore, the network 30 may include a leased line network such as an internet protocol-virtual private network (IP-VPN). Furthermore, the network 30 may include a wireless communication network such as Wi-Fi (registered trademark) and Bluetooth (registered trademark).

A configuration example of the information processing system according to the present embodiment has been described with reference to FIG. 2. Note that the above-described configuration described with reference to FIG. 2 is merely an example, and the configuration of the information processing system according to the present embodiment is not limited to the example. For example, the functions of the information processing terminal 10 and the information processing server 20 according to the present embodiment may be implemented by a single device. The configuration of the information processing system according to the present embodiment can be flexibly modified according to specifications and operations.

1.3. Functional Configuration Example of Information Processing Terminal 10

Figure 3:
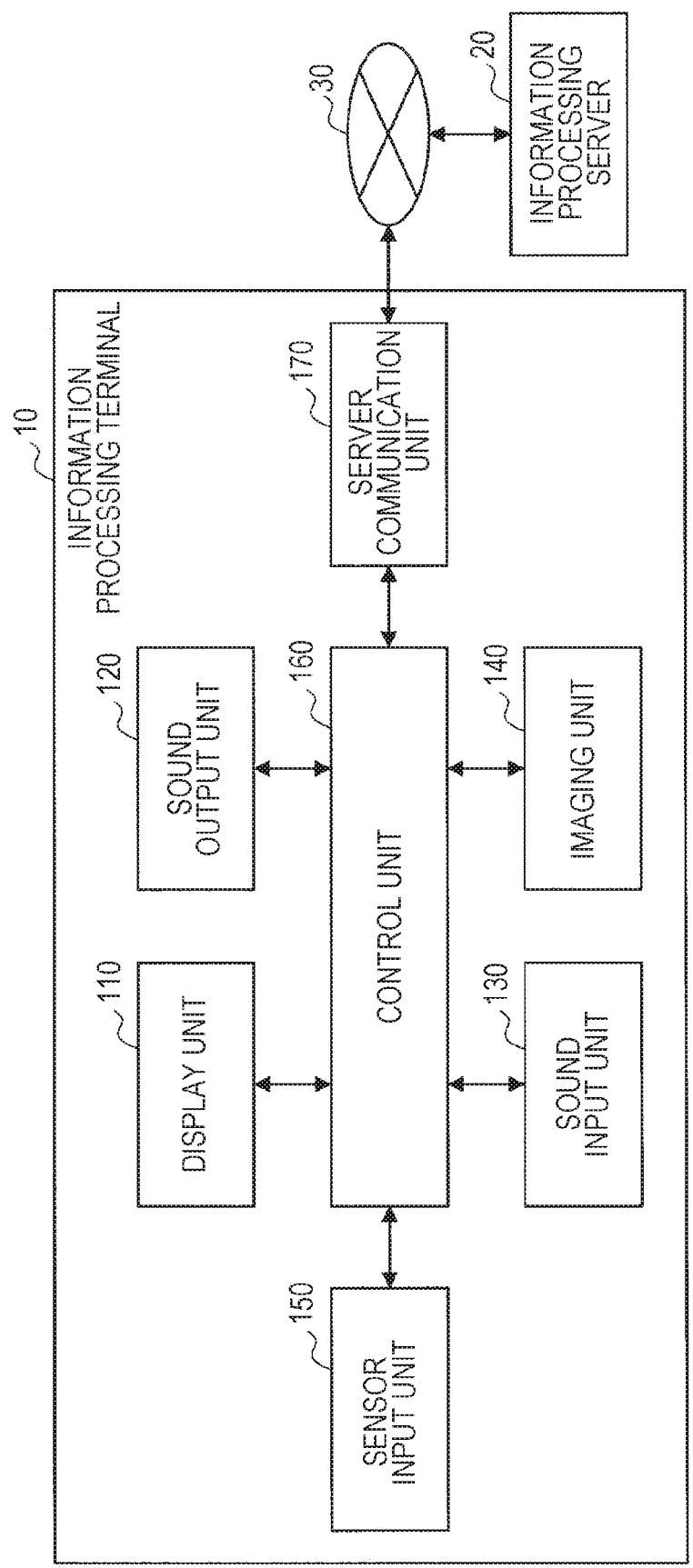
FIG. 3 is a block diagram illustrating a configuration example of an information processing terminal according to the embodiment.

Next, a functional configuration example of the information processing terminal 10 according to the present embodiment will be described with reference to FIG. 3. FIG. 3 is a block diagram illustrating a functional configuration example of the information processing terminal 10 according to the present embodiment. Referring to FIG. 3, the information processing terminal 10 according to the present embodiment includes a display unit 110, a sound output unit 120, a sound input unit 130, an imaging unit 140, a sensor input unit 150, a control unit 160, and a server communication unit 170.

(1) Display Unit 110

The display unit 110 according to the present embodiment has a function to output visual information such as images and texts. The display unit 110 according to the present embodiment displays texts and images corresponding to the response information on the basis of control by the information processing server 20, for example.

For this purpose, the display unit 110 according to the present embodiment includes a display device for presenting the visual information, and the like. Examples of the display device include a liquid crystal display (LCD) device, an organic light emitting diode (OLED) device, a touch panel, and the like. Furthermore, the display unit 110 according to the present embodiment may output the visual information using a projection function.

(2) Sound Output Unit 120

The sound output unit 120 according to the present embodiment has a function to output various sounds including sound utterances. The sound output unit 120 according to the present embodiment outputs a sound utterance corresponding to the response information on the basis of control by the information processing server 20, for example. For this purpose, the sound output unit 120 according to the present embodiment includes a sound output device such as a speaker and an amplifier.

(3) Sound Input Unit 130

The sound input unit 130 according to the present embodiment has a function to collect sound information such as utterances by the user and ambient sounds generated around the information processing terminal 10. The sound information collected by the sound input unit 130 is used for sound recognition, recognition of the surrounding environment, and the like by the information processing server 20. The sound input unit 130 according to the present embodiment includes a microphone for collecting the sound information.

(4) Imaging Unit 140

The imaging unit 140 according to the present embodiment has a function to capture an image of the user and the surrounding environment. Image information captured by the imaging unit 140 is used for action recognition and state recognition of the user and recognition of the surrounding environment by the information processing server 20. The imaging unit 140 according to the present embodiment includes an imaging device that can capture an image. Note that the above image includes a moving image in addition to a still image.

(5) Sensor Input Unit 150

The sensor input unit 150 according to the present embodiment has a function to collect various types of sensor information regarding the surrounding environment and an action and a state of the user. Sensor information collected by the sensor input unit 150 is used for the recognition of the surrounding environment, and the action recognition and state recognition of the user by the information processing server 20. The sensor input unit 150 includes, for example, an optical sensor including an infrared sensor, an acceleration sensor, a gyro sensor, a geomagnetic sensor, a thermal sensor, a vibration sensor, a global navigation satellite system (GNSS) signal receiving device, and the like.

Furthermore, the sensor input unit 150 according to the present embodiment has a function to detect an input sentence input by a user by device operation. For this purpose, the sensor input unit 150 according to the present embodiment includes, for example, a keyboard, a touch panel, a mouse, various buttons, and the like.

(6) Control Unit 160

The control unit 160 according to the present embodiment has a function to control configurations included in the information processing terminal 10. The control unit 160 controls, for example, start and stop of the configurations. Furthermore, the control unit 160 inputs a control signal generated by the information processing server 20 to the display unit 110 and the sound output unit 120. Furthermore, the control unit 160 according to the present embodiment may have a function equivalent to an output control unit 250 of the information processing server 20 to be described below.

(7) Server Communication Unit 170

The server communication unit 170 according to the present embodiment has a function to perform information communication with the information processing server 20 via the network 30. Specifically, the server communication unit 170 transmits the sound information collected by the sound input unit 130, the image information captured by the imaging unit 140, and the sensor information collected by the sensor input unit 150 to the information processing server 20. Furthermore, the server communication unit 170 receives a control signal regarding output of response information from the information processing server 20, and the like.

A functional configuration example of the information processing terminal 10 according to the present embodiment has been described with reference to FIG. 3. Note that the above-described configuration described with reference to FIG. 3 is merely an example, and the functional configuration of the information processing terminal 10 according to the present embodiment is not limited to the example. For example, the information processing terminal 10 according to the present embodiment does not necessarily have all of the configurations illustrated in FIG. 3. For example, the information processing terminal 10 can have a configuration without including the display unit 110, the sensor input unit 150, and the like. Furthermore, as described above, the control unit 160 according to the present embodiment may have a function equivalent to the output control unit 250 of the information processing server 20. The functional configuration of the information processing terminal 10 according to the present embodiment can be flexibly modified according to specifications and operations.

1.4. Functional Configuration Example of Information Processing Server 20

Figure 4:
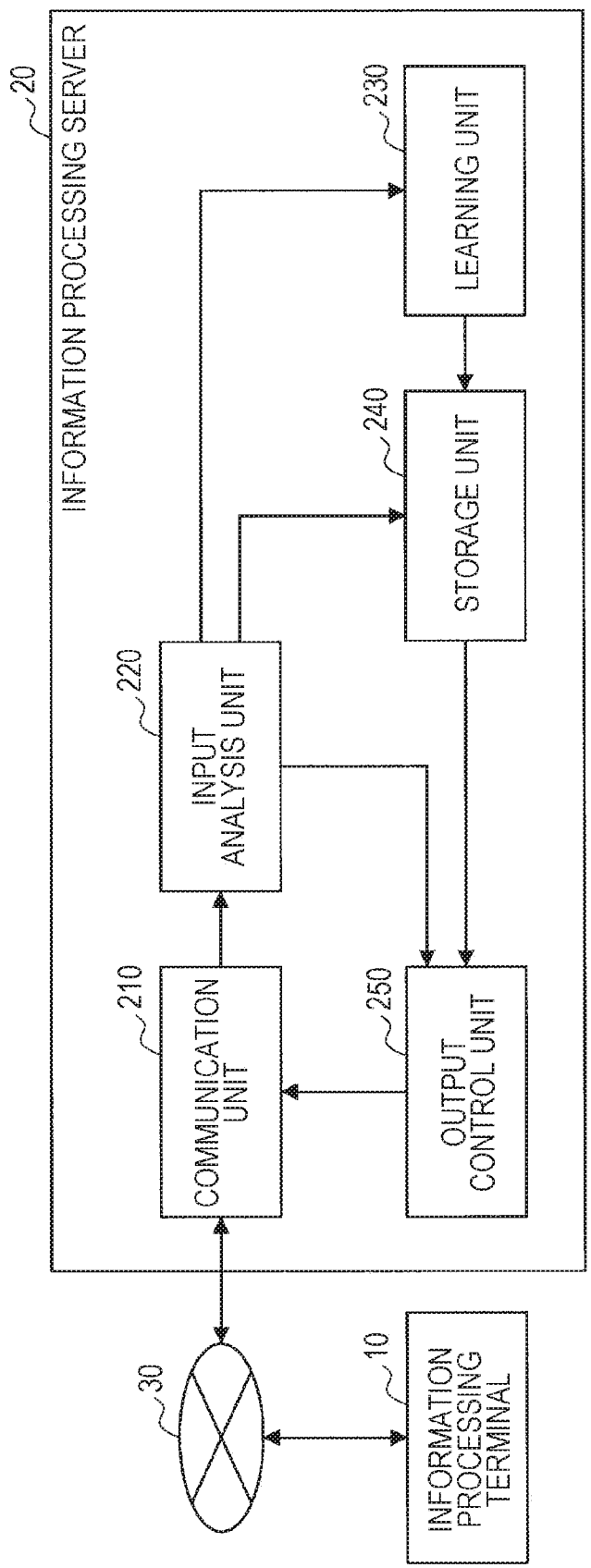
FIG. 4 is a block diagram illustrating a configuration example of an information processing server according to the embodiment.

Next, a functional configuration example of the information processing server 20 according to the present embodiment will be described with reference to FIGS. 4 to 6. FIG. 4 is a block diagram illustrating a functional configuration example of the information processing server 20 according to the present embodiment. Referring to FIG. 4, the information processing server 20 according to the present embodiment includes a communication unit 210, an input analysis unit 220, a learning unit 230, a storage unit 240, and an output control unit 250.

(1) Communication Unit 210

The communication unit 210 according to the present embodiment has a function to perform information communication with the information processing terminal 10 via the network 30. Specifically, the communication unit 210 receives the sound information, image information, sensor information, and the like from the information processing terminal 10. Furthermore, the communication unit 210 transmits a control signal regarding the output of response information to the information processing terminal 10.

(2) Input Analysis Unit 220

The input analysis unit 220 according to the present embodiment has a function to analyze input information. For example, the input analysis unit 220 according to the present embodiment has a function to analyze sound information regarding an utterance of the user collected by the information processing terminal 10. More specifically, the input analysis unit 220 converts the sound information into information that can be used by another configuration on the basis of an analysis result of the sound information. For example, the input analysis unit 220 converts content of the utterance of the user based on the sound information regarding the utterance of the user into text. Then, the input analysis unit 220 analyzes the meaning of the utterance of the user on the basis of the text.

As described above, the input analysis unit 220 can acquire the specific expression included in the utterance of the user by analyzing the sound information regarding the input utterance of the user. After acquiring the specific expression, the input analysis unit 220 outputs the specific expression to another configuration. For example, in the case of acquiring the specific expression at the time of learning the specific expression, the input analysis unit 220 outputs the specific expression to the learning unit 230. Furthermore, in the case of acquiring the specific expression at the time of applying the specific expression, the input analysis unit 220 outputs the specific expression to the output control unit 250.

Furthermore, the input analysis unit 220 according to the present embodiment has a function to analyze the image collected by the information processing terminal 10. For example, the input analysis unit 220 analyzes the input image, whereby recognizing the recognition target and acquiring information regarding the recognition target (hereinafter also referred to as recognition target information).

Furthermore, the input analysis unit 220 analyzes the image and recognizes a state and an action of the user, an object, and the surrounding environment. The input analysis unit 220 can recognize the user's line-of-sight, facial expression, emotion, action, and the like by analyzing the image. Furthermore, the input analysis unit 220 can also estimate characteristics of a location where the user is located on the basis of, for example, the image information and the sensor information.

As described above, after analyzing the image and acquiring the recognition target information, the input analysis unit 220 outputs the recognition target information to another configuration. For example, in the case of acquiring the recognition target information at the time of learning the specific expression, the input analysis unit 220 outputs the recognition target information to the learning unit 230 and the storage unit 240. Furthermore, in the case of acquiring the recognition target information at the time of applying the specific expression, the input analysis unit 220 outputs the recognition target information to the output control unit 250.

(3) Learning Unit 230

The learning unit 230 according to the present embodiment has a function to perform learning based on input information using an algorithm such as deep learning. For example, the learning unit 230 according to the present embodiment leans by associating the recognition target recognized on the basis of the input information with the specific expression acquired on the basis of the input information. More specifically, the learning unit 230 associates the recognition target information with the specific expression input from the input analysis unit 220, and then outputs and stores the associated information to the storage unit 240.

As an example of learning the specific expression in the learning unit 230, for example, the learning unit 230 learns an object recognized on the basis of an image and a name in association with each other. Specifically, the learning unit 230 associates the recognition target recognized by the input analysis unit 220 by analyzing the image with the name of the recognition target. Then, the learning unit 230 outputs the associated information to the storage unit 240.

Furthermore, the learning unit 230 learns an object recognized from an image and a specific expression used by the user for the object recognized from a sound in association with each other. More specifically, the learning unit 230 associates the recognition target recognized by the input analysis unit 220 by analyzing the image with the specific expression used by the user for the recognition target recognized by the input analysis unit 220 by analyzing sound information. Then, the learning unit 230 outputs the associated information to the storage unit 240.

As described above, using the image and the sound is effective when the information processing server 20 cannot recognize the sound well. For example, in a case where the utterance of the user 40 cannot be clearly recognized and there is a plurality of recognition candidates, a recognition candidate closest to content of information presented by the user 40 can be selected on the basis of an image indicating the information.

Furthermore, the learning unit 230 learns the specific expression recognized from the sound and an object recognized on the basis of record information regarding the user in association with each other. More specifically, the learning unit 230 associates the specific expression recognized by the input analysis unit 220 by analyzing the sound information with the recognition target specified on the basis of record information such as a schedule. Then, the learning unit 230 outputs the associated information to the storage unit 240.

For example, it is assumed that the user 40 has given an utterance of "What bag was used at the previous wedding?" to the information processing terminal 10. At this time, the information processing server 20 searches for a wedding day from the schedule of the user 40 and analyzes a photograph of the day to identify the bag used by the user 40 at the wedding. Then, the learning unit 230 learns the specific expression of "bag at the wedding" recognized from the sound and the object of "bag" recognized on the basis of the record information regarding the user in association with each other.

Furthermore, as a record regarding the user, it is assumed that the information processing server 20 registered uttered content and an image corresponding to the uttered content when another user 40 gave an utterance in the past. Even if the information processing server 20 has not been able to clearly recognize the utterance of the user 40, in a case where the utterance of the user 40 is similar to the past utterance of another user 40, the information processing server 20 can correct the erroneously recognized sound on the basis of the image.

For example, it is assumed that when the user 40B uttered "go to the bank" in the past, an image of the bank was registered. Then, it is assumed that the user 40A has uttered "go to the bank (ginko)" but the information processing server 20 has recognized "go to the suburbs (kinko)". At this time, in a case of estimating that the information processing server 20 erroneously recognized the sound since the pronunciations of "suburbs (kinko)" and "bank (ginko)" are similar, the information processing server 20 can check with the user 40A by presenting the image of the bank registered by the user 40B in the past.

Furthermore, the learning unit 230 learns a specific expression used by an utterer for an utterance target person and the utterance target person in association with each other. For example, suppose that there is a mother and a child, the mother is the utterer, and the child is the utterance target person. The child's name is "Yuta" but the child responds to the mother even when the mother calls the child "Yu-chan". In this case, the input analysis unit 220 recognizes that the specific expression used by the mother who is the utterer for the child who is the utterance target person is "Yu-chan". Then, the learning unit 230 learns the specific expression of "Yu-chan" and the child who is the utterance target person in association with each other.

Furthermore, the learning unit 230 re-evaluates the association between the utterance target person and the specific expression according to characteristics of the utterance target person. For example, suppose that there is a family consisting of a father, a mother and two children, and the mother is the utterer and the father and two children are the utterance target persons. When the mother calls "men," the father and the two children respond. However, when the mother calls "boys", the two children respond and the father does not. Both the above expressions are expressions for men whose gender is male but the response differs depending on whether the utterance target person is an adult or a child.

Therefore, when the information processing terminal 10 saw the state of the above example and the information processing server 20 learned, the information processing server 20 recognizes that "adult" and "child" are characteristics of the utterance target persons. Furthermore, the information processing server 20 recognizes that the expression "men" is a specific expression for the father and the two children. Furthermore, the information processing server 20 recognizes that the expression "boys" is a specific expression for the two children.

In a case where the two children grow up and become adults, the information processing server 20 may re-evaluate the specific expression for the two children and update the specific expression from "boys" to "adults".

Note that the learning unit 230 may perform learning of an answer to a user's inquiry and the like, image recognition, sound recognition, and machine control, in addition to learning of a specific expression. Furthermore, the learning algorithm according to the present embodiment is not limited to the above example, and may be appropriately selected according to a characteristic of the generated response information. Furthermore, the learning unit 230 may use the learning methods in the above-described learning examples in combination.

(4) Storage Unit 240

The storage unit 240 has a function to store information acquired by the input analysis unit 220. For example, the storage unit 240 stores information regarding the users acquired by the input analysis unit 220 in a user DB, and stores information regarding objects acquired by the input analysis unit 220 in a general object DB.

The user DB is a database that stores various types of information regarding the users. The user DB stores attribute information such as age, gender, and relationship among users, for example, in addition to user names and IDs. The relationship among the users may include, for example, attributes in a family such as the wife and the husband, the mother and a child, attributes in an organization such as a boss and a subordinate, and other attributes.

Furthermore, the user DB may store users' schedules, records of recognition targets used by users, and the like. The above information can be used when the learning unit 230 associates the recognition target with the specific expression. Moreover, the user DB may store image information, sound characteristics, and the like of the users. The input analysis unit 220 can also identify a user on the basis of the above information stored in the user DB.

The general object DB is a database that stores various types of information regarding objects. The general object DB may store information indicating characteristics of the object such as color, size, and shape, for example, in addition to general names of the objects.

Furthermore, the storage unit 240 also has a function to store information learned by the learning unit 230. For example, the storage unit 240 stores information learned by the learning unit 230 in a specific expression DB. More specifically, the storage unit 240 stores information regarding the recognition target and the specific expression associated by the learning unit 230 in the specific expression DB.

Here, a configuration of the specific expression DB will be described with reference to FIG. 5. FIG. 5 is an explanatory diagram illustrating a configuration example of the specific expression DB according to the present embodiment. As illustrated in FIG. 5, in the specific expression DB, the general expression of the recognition target and the specific expression used by the user 40 for the recognition target are stored in association with each other. For example, in the case of the example illustrated in FIG. 1, the general expression of "dish" acquired by the input analysis unit 220 by analyzing the input image, and the specific expression of "curry dish" acquired by the input analysis unit 220 by analyzing the input sound are stored in association with each other.

Furthermore, the specific expression DB may store information regarding a target user, the number of times, and an image, in addition to the general expression and the specific expression. The target user is a user who is used the registered specific expression and is stored in association with the specific expression. For example, suppose that a mother used a children's language for a baby. At this time, since the specific expression is the children's language and the target user is the baby, the children's language and the baby are stored in association with each other. Then, the information processing terminal 10 can give an utterance to the baby using the children's language. In a case where the target user is a user using the specific expression, the children's language and the mother are associated with each other. Then, the information processing terminal 10 will use the children's language for the mother, which is wrong. Therefore, it is important that the target user is a user is used the specific expression.

Furthermore, the number of times is the number of times the recognition target is recognized and is stored in association with the specific expression. Furthermore, the image is an image of the recognition target or an image indicating information regarding the recognition target, and is stored in association with the specific expression. Note that the number of times and the image does not need to be necessarily stored.

Note that, in the specific expression DB illustrated in FIG. 5, a plurality of target persons is registered in one record. However, one record may be created for one target user and registered.

(5) Output Control Unit 250

The output control unit 250 has a function to control output of the response information to the user. The output control unit 250 according to the present embodiment is characterized in controlling output expression of the response information on the basis of the specific expression stored in the storage unit 240 by the learning of the learning unit 230 and the information acquired by the input analysis unit 220.

In controlling the output expression, the output control unit 250 first determines whether or not the specific expression is applicable to presented information on the basis of at least one input information of an input sound or an input image.

For example, in the case of making determination on the basis of an input image, the output control unit 250 checks whether or not there is a specific expression applicable to the recognition target recognized based on the image. At this time, the output control unit 250 checks whether or not a specific expression associated with the recognition target is registered in the specific expression DB of the storage unit 240. In a case where there is an applicable specific expression as a result of the check, the output control unit 250 determines that the specific expression is applicable to the information to be presented.

Furthermore, in the case of making determination on the basis of an input sound, the output control unit 250 checks whether or not there is a specific expression applicable to the linguistic expression recognized on the basis of the sound. At this time, the output control unit 250 checks whether or not a specific expression corresponding to the linguistic expression is registered in the specific expression DB of the storage unit 240. In a case where there is an applicable specific expression as a result of the check, the output control unit 250 determines that the specific expression is applicable to the information to be presented.

In a case where the output control unit 250 determines that the specific expression is applied to the information to be presented as a result of the above-described each determination processing, the output control unit 250 outputs the response information to which the specific expression is applied to the communication unit 210. Here, the response information output by the output control unit 250 is, for example, sound information relating to a response to the utterance of the user. The output control unit 250 applies the specific expression to the sound information. Note that the information processing terminal 10 may spontaneously output information even when an utterance from the user 40 is not input.

Note that, in a case where an image corresponding to the specific expression is registered in the specific expression DB of the storage unit 240, the output control unit 250 may execute information presentation using both the image and the sound. The output control unit 250 can present more detailed information to the user by responding to the utterance of the user using not only the sound but also the image.

Note that, in a case where the output control unit 250 determines that the specific expression is not applied to the information to be presented on the basis of a plurality of detected users as a result of the above-described each determination processing, the output control unit 250 causes the information processing terminal 10 to execute information presentation using a general expression. For example, in a case where a user who does not belong to a group is identified from the plurality of detected users, the output control unit 250 determines that the specific expression is not applied to the information to be presented and causes the information processing terminal 10 to execute information presentation using a general expression. A specific example will be described with reference to FIG. 6. FIG. 6 is an explanatory diagram illustrating an example of information presentation to a user not belonging to a group according to the present embodiment.

The left side in FIG. 6 illustrates an example of information presentation by the information processing terminal 10 in a case where the user 40A belongs to a group to which the specific expression is applicable. For example, the user 40A asks a question of "Who should I apply for transportation expenses?" (user utterance 380) to the information processing terminal 10. In response to the question, the information processing terminal 10 presents information using the specific expression of "Apply to UL" (terminal utterance 382).

In contrast with the above example, the right side in FIG. 6 illustrates an example of information presentation by the information processing terminal 10 in a case where the user 40B does not belong to the group to which the specific expression is applicable. For example, the user 40B asks a question of "Who should I apply for transportation expenses?" (user utterance 384) to the information processing terminal 10. In response to the question, the information processing terminal 10 presents information using the general expression of "Apply to the unit leader DDD" (terminal utterance 386).

A functional configuration example of the information processing server 20 according to the present embodiment has been described with reference to FIGS. 4 to 6. Note that the above-described configuration described with reference to FIG. 4 is merely an example, and the functional configuration of the information processing server 20 according to the present embodiment is not limited to the example. For example, the input analysis unit 220, the learning unit 230, the storage unit 240, and the like can be provided in another device different from the information processing server 20.

Furthermore, as described above, the function of the output control unit 250 according to the present embodiment may be implemented as the function of the control unit 160 of the information processing terminal 10. That is, the function of the output control unit 250 according to the present embodiment can be implemented as a function on both the server side and the client side. For example, in a case where the function is provided as the function of the information processing server 20, the user can enjoy services on various information processing terminals 10. Meanwhile, in a case where the information processing terminal 10 has an equivalent function to the output control unit 250, or the input analysis unit 220, the learning unit 230, the storage unit 240, and the like, offline use and more secure storage of personal information, and the like become possible. The functional configuration of the information processing server 20 according to the present embodiment can be flexibly modified according to specifications and operations.

1.5. Operation Example

Figure 7:
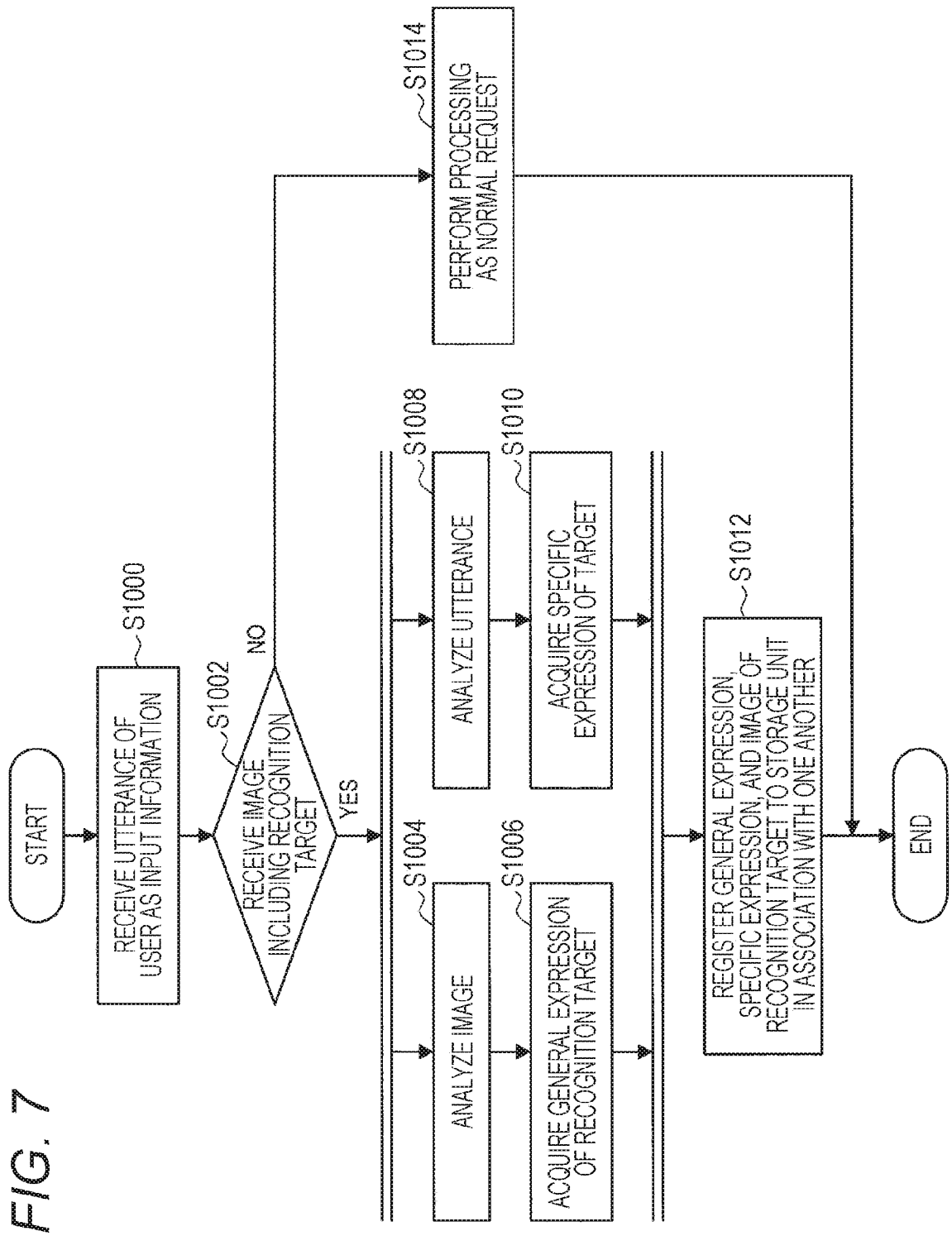
FIG. 7 is a flowchart illustrating an operation example of the information processing server when learning a specific expression according to the embodiment.
Figure 8:
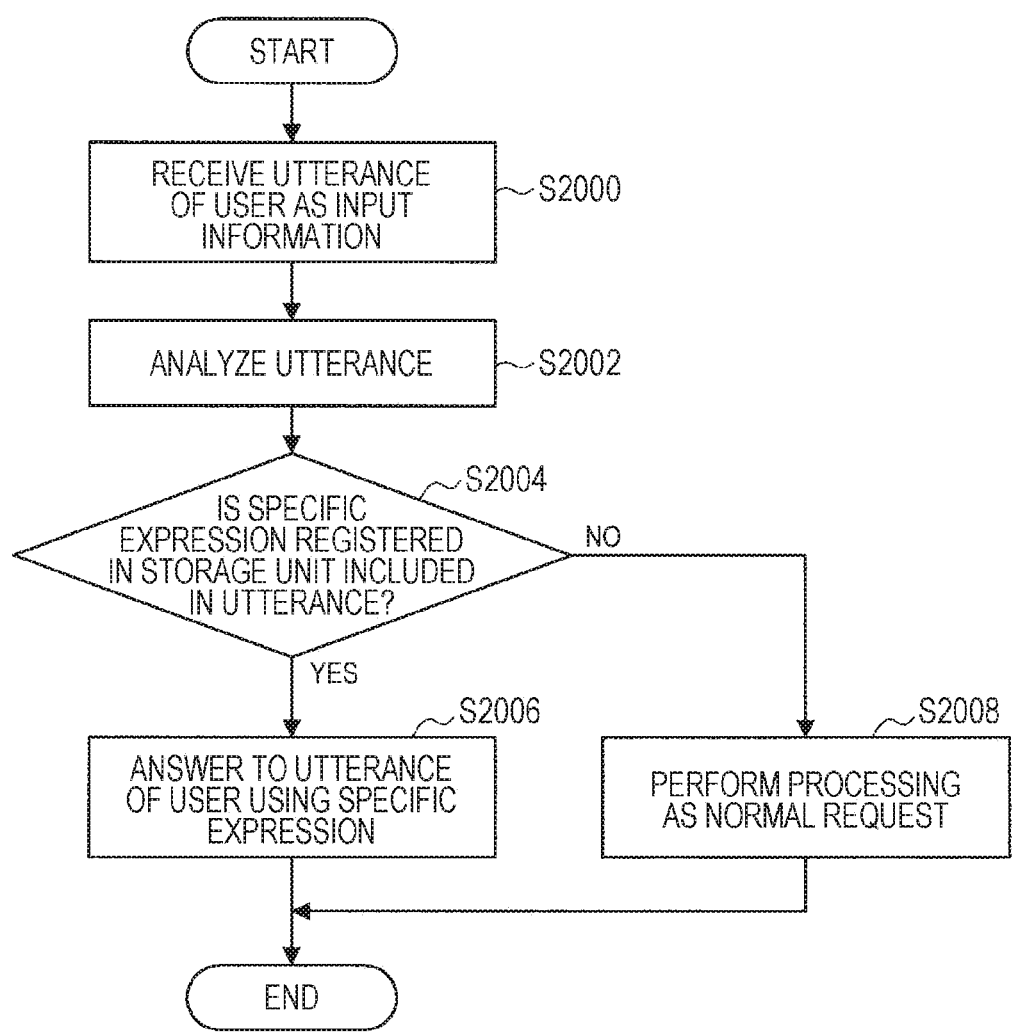
FIG. 8 is a flowchart illustrating an operation example of the information processing server when applying a specific expression according to the embodiment.

Hereinafter, an operation example of the information processing server 20 according to the present embodiment will be described with reference to FIGS. 7 and 8. First, an operation example of the information processing server 20 when the information processing server 20 learns a specific expression on the basis of input information from the user will be described with reference to FIG. 7. FIG. 7 is a flowchart illustrating an operation example of the information processing server 20 when learning a specific expression according to the present embodiment.

First, the communication unit 210 of the information processing server 20 receives an utterance of the user acquired by the information processing terminal 10 via the network 30 as input information (step S1000). The communication unit 210 that has received the input information outputs the input information to the input analysis unit 220.

The input analysis unit 220 to which the input information has been input from the communication unit 210 checks whether or not having received an image including a recognition target (step S1002). In a case of not having received the image (step S1002/NO), the information processing server 20 performs processing as a normal request (step S1014).

In a case of having received the image including a recognition target (step S1002/YES), the input analysis unit 220 performs analysis processing for the input information. Note that the input analysis unit 220 may execute processing of steps S1004 and 1006 of analyzing an image and acquiring a general expression and processing of steps S1008 and 1010 of analyzing the utterance and acquiring a specific expression as parallel processing.

As the first parallel processing, the input analysis unit 220 analyzes the input image (step S1004). Then, the input analysis unit 220 acquires the general expression on the basis of an analysis result of the image (step S1006). After acquiring the general expression, the input analysis unit 220 outputs the general expression to the learning unit 230.

As the second parallel processing, the input analysis unit 220 analyzes the input utterance (step S1008). Then, the input analysis unit 220 acquires the specific expression on the basis of an analysis result of the utterance (step S1010). After acquiring the specific expression, the input analysis unit 220 outputs the specific expression to the learning unit 230.

After the completion of the parallel processing, the learning unit 230 registers the general expression, the specific expression, and the image of the recognition target input from the input analysis unit 220 in the storage unit 240 in association with one another (step S1012).

The operation example when the information processing server 20 learns the specific expression of the recognition target has been described with reference to FIG. 7.

Next, an operation example when the information processing server 20 controls information presentation using a specific expression on the basis of input information from the user will be described with reference to FIG. 8. FIG. 8 is a flowchart illustrating an operation example of the information processing server 20 when applying a specific expression according to the present embodiment.

First, the communication unit 210 of the information processing server 20 receives an utterance of the user acquired by the information processing terminal 10 via the network 30 as input information (step S2000). The communication unit 210 that has received the input information outputs the input information to the input analysis unit 220.

The input analysis unit 220 that has received the input information from the communication unit 210 analyzes the utterance included in the input information (step S2002). The input analysis unit 220 checks whether or not a specific expression registered in the storage unit 240 is included in the utterance on the basis of an analysis result (step S2004).

In the case where the specific expression is included in the utterance (step S2004/YES), the input analysis unit 220 answers to the user's utterance using the specific expression (step S2006).

Furthermore, in the case where the specific expression is not included in the utterance, the information processing server 20 performs processing as a normal request (step S2008).

Note that, in the above-described operation example, the processing is started when the communication unit 210 has received the utterance of the user as the input information as a trigger in steps S1000 and S2000. However, the trigger is not limited to the above example. For example, the processing may be started when the communication unit 210 has received an image as the input information as a trigger.

The operation example when the information processing server 20 controls the information presentation using the specific expression has been described above with reference to FIG. 8.

The information processing system according to the embodiment of the present disclosure has been described above with reference to FIGS. 1 to 8. Next, modifications according to the embodiment of the present disclosure will be described.

2. Modification

Hereinafter, modifications of the embodiment of the present disclosure will be described. Note that the modifications to be described below may be solely applied to the embodiment of the present disclosure or may be applied to the embodiment of the present disclosure in combination. Furthermore, the modifications may applied in place of a configuration described in the embodiment of the present disclosure or may be additionally applied to a configuration described the embodiment of the present disclosure.

(1) First Modification

In the above-described embodiment, the example of performing the determination processing based on an input sound has been described with reference to FIG. 1. However, determination processing in which determination processing based on an input image and determination processing based on an input sound are combined may be performed.

Figure 9:
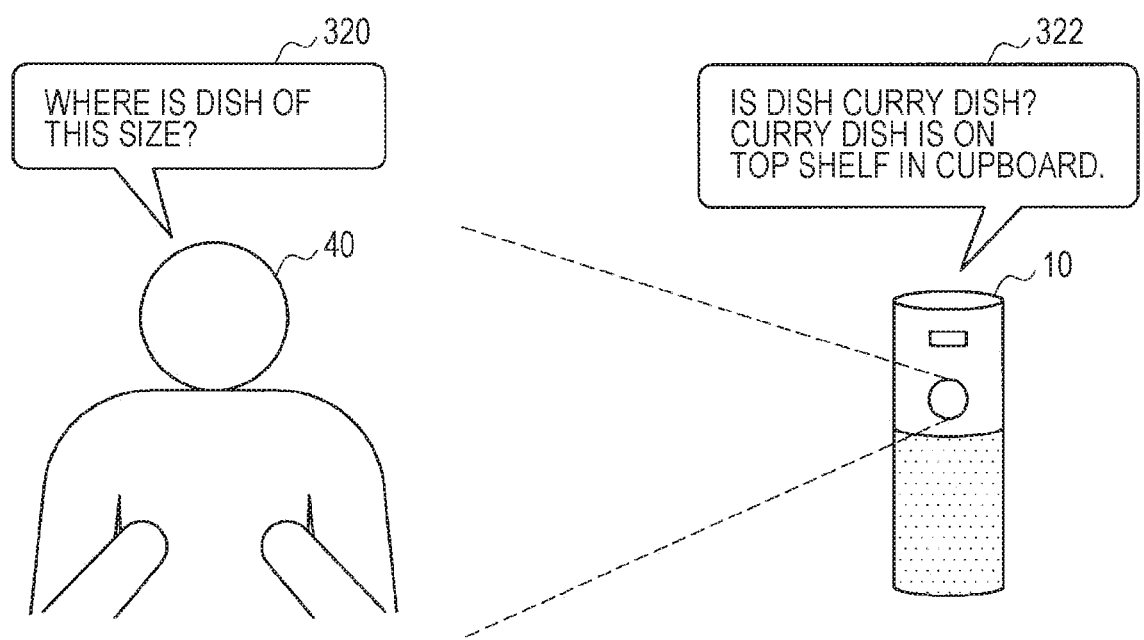
FIG. 9 is an explanatory diagram illustrating an application example of a specific expression based on a sound and an image presented by a user according to the embodiment.

A specific example will be described with reference to FIG. 9. FIG. 9 is an explanatory diagram illustrating an application example of a specific expression based on a sound and an image presented by the user according to the present embodiment. The user 40 illustrated in FIG. 9 is performing a gesture indicating the size of a dish in addition to an utterance of "Where is a dish of this size?" (user utterance 320). The user utterance 320 is input as a sound and the gesture of the user 40 is input as an image to the information processing terminal 10. The information processing server 20 performs the above-described determination processing on the basis of the input sound and image.

In the example illustrated in FIG. 9, the information processing server 20 recognizes the size of the dish from the gesture of the user 40, and determines that a specific expression is applicable because the information that the dish of the size is the curry dish is registered in the storage unit 240. Then, the information processing terminal 10 has given an utterance of "Is the dish a curry dish? The curry dish is on the top shelf in the cupboard" (terminal utterance 322) on the basis of response information to which the information processing server 20 has applied the specific expression.

As described above, the information processing server 20 can recognize the action of the user 40, and thus the range of the specific expression recognizable by the information processing server 20 is enlarged. Then, the range of communication performed by the information processing terminal 10 with the user 40 is also enlarged. Therefore, the information processing server 20 can improve the convenience of the information processing terminal 10 for the user 40.

(2) Second Modification

In the above-described embodiment, the example in which the learning unit 230 of the information processing server 20 learns the general expression and the specific expression in association with each other has been described. However, the learning unit 230 may further learn the specific expression and an image illustrating information regarding the specific expression in association with each other.

A specific example will be described with reference to FIG. 10. FIG. 10 is an explanatory diagram illustrating a learning example and an application example of a specific expression based on a sound and an image presented by the user according to the present embodiment. The left side in FIG. 10 illustrates a situation where the user 40 causes the information processing terminal 10 to learn a new placing place by moving the placing place of the curry dish 52 for which a specific expression has been registered. Specifically, the user 40A causes the information processing terminal 10 to learn by giving, to the information processing terminal 10, an utterance of "I change the place where the curry dish is placed" (user utterance 340) and showing an action to move the curry dish 52 on the top shelf in a cupboard 54 to a bottom shelf in the cupboard 54.

At this time, the information processing terminal 10 acquires information regarding the action of the user 40A as an image. For example, the information processing terminal 10 acquires a state in which the curry dish 52 is placed at the new placing place as a still image by the imaging unit 140. Furthermore, the information processing terminal 10 may acquire a series of actions to move the curry dish 52 by the user 40A as a moving image by the imaging unit 140.

The information processing terminal 10 that has acquired the image of the information regarding the action transmits the image to the information processing server 20. Then, the learning unit 230 of the information processing server 20 that has received the image learns the specific expression of the curry dish 52 registered in the storage unit 240 and the image in association with each other and stores the learned content in the storage unit 240.

Furthermore, the right side in FIG. 10 illustrates a situation where another user 40 has asked the information processing terminal 10 about the place of the curry dish 52 after the movement of the curry dish 52. Specifically, the user 40B has asked the information processing terminal 10 "Where is the curry dish?" (user utterance 342). The information processing terminal 10 that has received the utterance from the user 40B causes the information processing server 20 to analyze the utterance.

The information processing server 20 recognizes that the specific expression of "curry dish" is used in the user utterance 342 from an analysis result, and checks whether or not the specific expression of "curry dish" is registered in the specific expression DB of the storage unit 240. At this time, in a case where the specific expression is registered and an image associated with the specific expression is registered, the information processing server 20 may cause the information processing terminal 10 to execute information presentation using the image. In the example illustrated in FIG. 10, the image associated with the "curry dish" by the user 40A is registered. Therefore, the information processing terminal 10 may display an image 56 using the display unit 110 in addition to "The curry dish has been moved to the bottom shelf in the cupboard" (terminal utterance 344).

As described above, the information processing server 20 causes the information processing terminal 10 to present an image, so that the user 40 can understand the information presented by the information processing terminal 10 in more detail. Therefore, the information processing server 20 can improve the convenience of the information processing terminal 10 for the user 40.

(3) Third Modification

In the above-described embodiment, the example in which the information processing terminal 10 acquires the information presented by the user 40 as an image has been described. However, the information processing terminal 10 may spontaneously acquire an image illustrating information of a recognition target and the information processing server 20 may operate to learn the specific expression. For example, the information processing terminal 10 captures an image illustrating a surrounding situation and transmits the image to the information processing server 20. In the information processing server 20, the input analysis unit 220 analyzes the image. Then, the information processing server 20 learns an object recognized by the learning unit 230 from the image and a name corresponding to the use of the object estimated from the image in association with each other on the basis of an analysis result.

Figure 11:
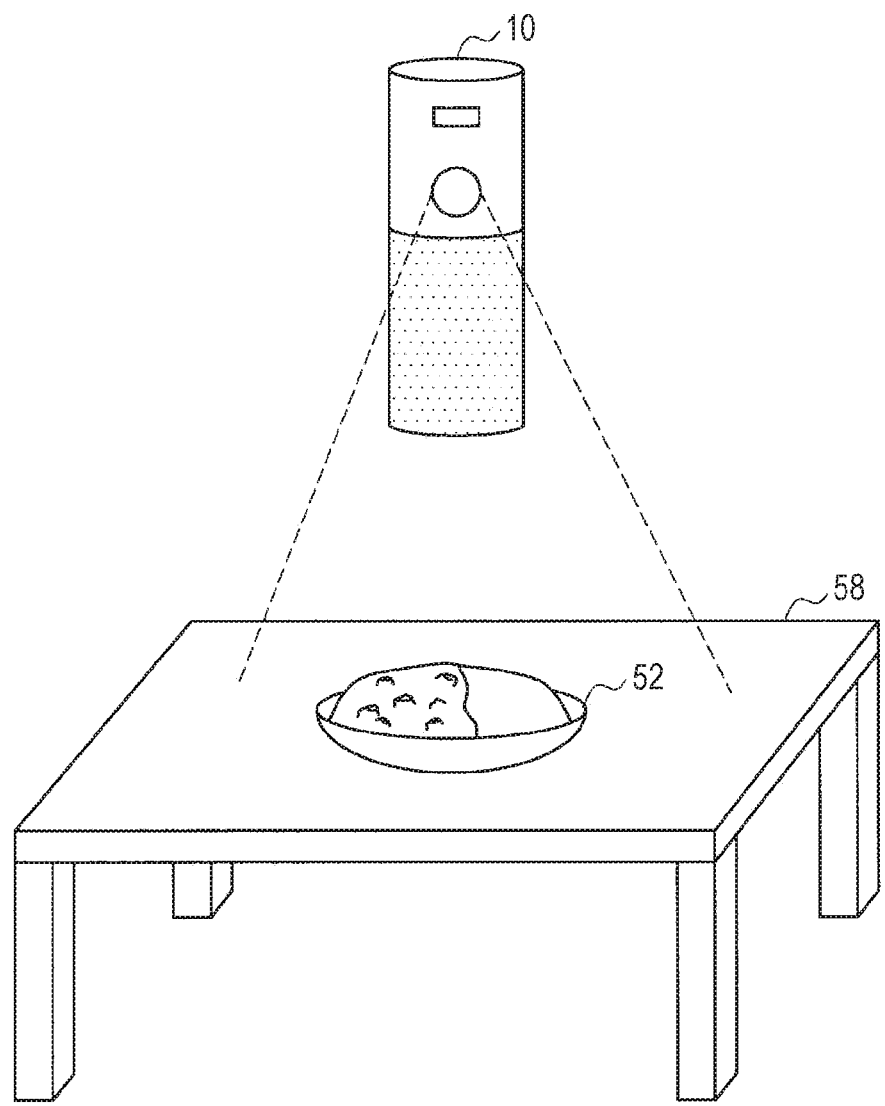
FIG. 11 is an explanatory diagram illustrating a learning example of a specific expression based on an image according to the embodiment.

A specific example will be described with reference to FIG. 11. FIG. 11 is an explanatory diagram illustrating a learning example of a specific expression based on an image according to the present embodiment. The information processing terminal 10 illustrated in FIG. 11 spontaneously acquires an image illustrating a surrounding situation and transmits the image to the information processing server 20. It is assumed that the input analysis unit 220 of the information processing server 20 has recognized that curry is placed on the dish 52 on a table 58 by analyzing the image. At this time, the learning unit 230 estimates that the dish 52 is used for serving curry and estimates its name as "curry dish". Then, the learning unit 230 learns the dish 52 that is an object recognized from the image and the "curry dish" that is a name corresponding to the estimated use in association with each other, and stores the learned content in the storage unit 240.

Furthermore, the learning unit 230 sets reliability of the specific expression used for the recognition target on the basis of the number of times the recognition target is recognized. For example, the learning unit 230 sets the number of times as a value indicating the reliability. Specifically, in a case where the number of times the recognition target is recognized is smaller than a predetermined number, the output control unit 250 determines that the reliability of the specific expression corresponding to the recognition target is low. Furthermore, in a case where the number of times the recognition target is recognized is larger than a predetermined number, the output control unit 250 determines that the reliability of the specific expression corresponding to the recognition target is high.

Then, the output control unit 250 controls output expression of the response information using the specific expression on the basis of a result of the above-described determination processing. For example, it is assumed that the output control unit 250 is asked a question inquiring about the place of the curry dish 52 by the user 40 in the case where the reliability of the "curry dish" that is the specific expression corresponding to the dish 52 is low. At that time, the output control unit 250 may cause the information processing terminal 10 to display an image illustrating the curry dish in addition to giving an utterance of "Is the curry dish this dish? This dish is placed on the top shelf in the cupboard".

As described above, the information processing server 20 learns on the basis of the information spontaneously acquired by the information processing terminal 10, so that the user 40 can save the labor of having the information processing server 20 learn a specific expression. Therefore, the information processing server 20 can improve the convenience of the information processing terminal 10 for the user 40.

(4) Fourth Modification

In the above-described embodiment, the example in which the information processing terminal 10 acquires the information presented by the user 40 as an image and the utterance given by the user 40 to the information processing terminal 10 as a sound has been described. However, the information processing terminal 10 may spontaneously acquire an image illustrating a surrounding situation and a sound emitted around, and the information processing server 20 may operate to learn a specific expression. For example, the information processing terminal 10 acquires an image in which users are having a conversation as the image illustrating a surrounding situation and acquires the users' conversation as the sound emitted around, and transmits the image and the sound to the information processing server 20. In the information processing server 20, the input analysis unit 220 analyzes the image and the sound. Then, the learning unit 230 learns an object recognized from the image and a specific expression used by the users for the object recognized from the users' conversation in association with each other on the basis of an analysis result.

Figure 12:
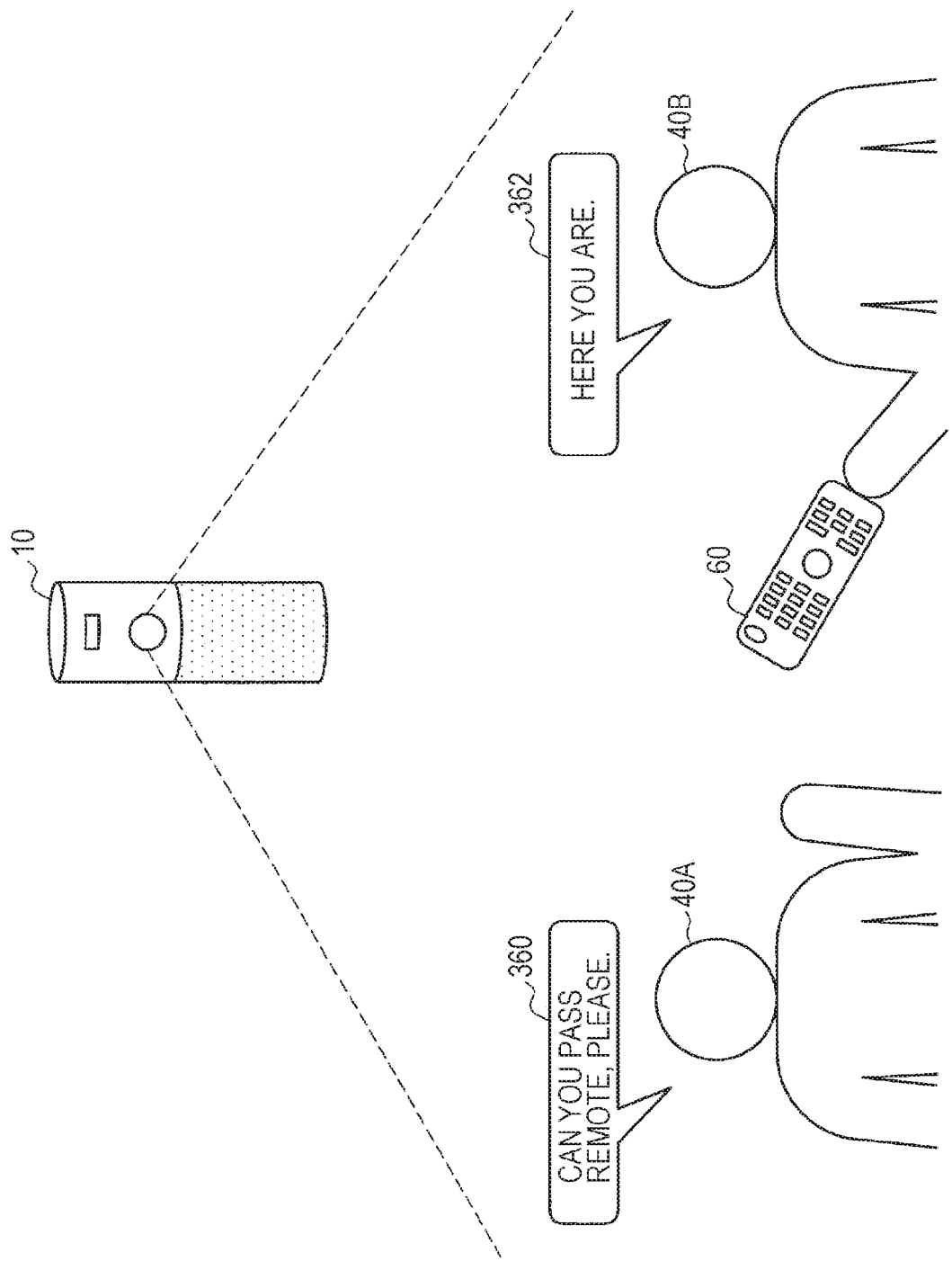
FIG. 12 is an explanatory diagram illustrating a learning example of a specific expression based on a sound and an image spontaneously acquired by the information processing terminal according to the embodiment.

A specific example will be described with reference to FIG. 12. FIG. 12 is an explanatory diagram illustrating a learning example of a specific expression based on a sound and an image spontaneously acquired by the information processing terminal 10 according to the present embodiment. The information processing terminal 10 illustrated in FIG. 12 acquires, as an image indicating a surrounding situation, a state in which the user 40A and the user 40B holding a remote controller 60 are having a conversation. Furthermore, the information processing terminal 10 acquires a user utterance 360 of "Can you pass the remote, please?" and a user utterance 362 of "Here you are", as the sound emitted around. Then, the information processing terminal 10 transmits the acquired image and sound to the information processing server 20.

The input analysis unit 220 of the information processing server 20 analyzes the image, thereby recognizing the remote controller 60 as a recognition target, and analyzes the sound, thereby recognizing that the users 40A and 40B use the specific expression of "remote" for the remote controller 60. Then, the learning unit 230 learns the remote controller 60 that is an object recognized from the image and the specific expression of "remote" acquired from the users' conversation in association with each other, and stores the learned content in the storage unit 240.

As described above, the information processing server 20 learns on the basis of the information spontaneously acquired by the information processing terminal 10, so that the user 40 can save the labor of having the information processing server 20 learn a specific expression. Therefore, the information processing server 20 can improve the convenience of the information processing terminal 10 for the user 40.

(5) Fifth Modification

In the above-described embodiment, the example in which the output control unit 250 of the information processing server 20 causes the information processing terminal 10 to execute information presentation using a general expression in the case where the user 40 does not belong to a group to which a specific expression is applicable has been described. However, even in a case where it is estimated that the user 40 does not understand the specific expression, the output control unit 250 determines that the specific expression is not applied to the information to be presented and causes the information processing terminal 10 to execute information presentation using a general expression.

Figure 13:
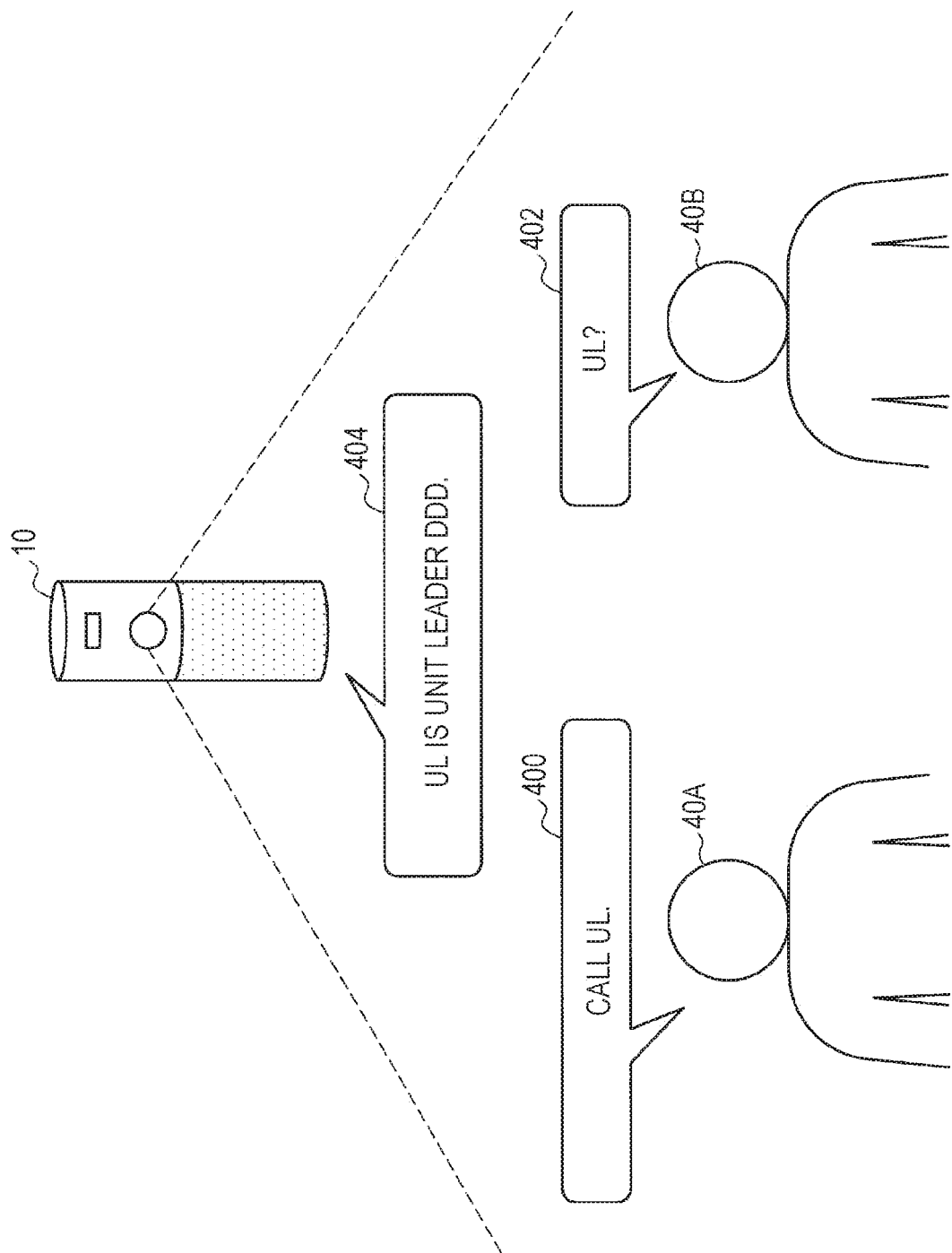
FIG. 13 is an explanatory diagram illustrating an example of information presentation in a case where it is estimated that the user according to the embodiment does not understand the specific expression.

A specific example will be described with reference to FIG. 13. FIG. 13 is an explanatory diagram illustrating an example of information presentation in a case where it is estimated that the user according to the present embodiment does not understand a specific expression. In the example illustrated in FIG. 13, the user 40A is giving an utterance of "call UL" (user utterance 400) to the user 40B. In response to the user utterance 400, the user 40B replies "UL?" (user utterance 402), indicating that the user 40B does not understand the content of the user utterance 400.

At this time, the information processing terminal 10 acquires the user utterance 400 and the user utterance 402 and transmits the user utterances to the information processing server 20. The input analysis unit 220 of the information processing server 20 analyzes the user utterance 400 and the user utterance 402. In a case where it is estimated that the user 40B does not understand the specific expression used by the user 40A from the analysis, the output control unit 250 causes the information processing terminal 10 to execute information presentation using a general expression corresponding to the specific expression used by the user 40A. In the case of the example illustrated in FIG. 13, the information processing terminal 10 presents information using a general expression of "UL is the unit leader DDD" (terminal utterance 404).

Note that the input analysis unit 220 may estimate whether or not the user 40 understands the specific expression by analyzing the facial expression of the user 40.

Furthermore, in the above-described example, the example regarding the specific expression used in the workplace has been described. However, the present modification can be applied to a case where a dialect is used as a specific expression. For example, assume that the user 40A has given an utterance to the user 40B using a dialect. At this time, in a case where it is estimated that the user 40B does not understand the dialect used by the user 40A from the analysis of the input analysis unit 220, the output control unit 250 causes the information processing terminal 10 to execute information presentation using a general expression corresponding to the dialect used by the user 40. Note that the learning unit 230 can learn a dialect, using the method described in the above embodiment or the modification. Therefore, the output control unit 250 may convert the dialect into a general expression using learned information, and cause the information processing terminal 10 to execute information presentation using the general expression. Furthermore, the output control unit 250 may convert the dialect into a general expression using information regarding the dialect registered in advance, and cause the information processing terminal 10 to execute information presentation using the general expression.

As described above, the information processing server 20 estimates the state of the user 40 and the information processing terminal 10 presents the information corresponding to the state, whereby the user can save the labor of doing research for himself/herself when there is something the user 40 does not know, for example. Therefore, the information processing server 20 can improve the convenience of the information processing terminal 10 for the user 40.

The modifications according to the embodiment of the present disclosure have been described with reference to FIGS. 9 to 13. Next, an application of the information processing system according to the embodiment of the present disclosure will be described.

3. Hardware Configuration Example

Next, a hardware configuration example common to the information processing terminal 10 and the information processing server 20 according to the embodiment of the present disclosure will be described with reference to FIG. 14. FIG. 14 is a block diagram illustrating a hardware configuration example of the information processing terminal 10 and the information processing server 20 according to the embodiment of the present disclosure. Referring to FIG. 14, the information processing terminal 10 and the information processing server 20 include, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the configuration elements may be omitted. Furthermore, the hardware configuration may further include a configuration element other than the configuration elements illustrated here.

(CPU 871)

The CPU 871 functions as, for example, an arithmetic processing unit or a control unit, and controls the overall operation or part of the configuration elements on the basis of various programs recorded in the ROM 872, RAM 873, storage 880, or removable recording medium 901.

(ROM 872 and RAM 873)

The ROM 872 is a means for storing a program read by the CPU 871, data used for calculation, and the like. The RAM 873 temporarily or permanently stores, for example, a program read by the CPU 871, various parameters that change as appropriate when the program is executed, and the like.

(Host Bus 874, Bridge 875, External Bus 876, and Interface 877)

The CPU 871, the ROM 872, and the RAM 873 are connected to one another via, for example, the host bus 874 capable of high-speed data transmission. Meanwhile, the host bus 874 is connected to the external bus 876 having a relatively low data transmission speed via the bridge 875, for example. Furthermore, the external bus 876 is connected to various configuration elements via the interface 877.

(Output Device 878)

As the input device 878, for example, a mouse, a keyboard, a touch panel, a button, a switch, a lever, and the like are used. Moreover, as the input device 878, a remote controller capable of transmitting a control signal using infrared rays or other radio waves may be used. Furthermore, the input device 878 includes a sound input device such as a microphone.

(Output Device 879)

The output device 879 is a device that can visually or audibly notify a user of acquired information, such as a display device such as a cathode ray tube (CRT), an LCD, or an organic EL, an audio output device such as a speaker or a headphone, a printer, a mobile phone, or a facsimile, for example. Furthermore, the output device 879 according to the present disclosure includes various vibration devices that can output tactile stimuli.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable recording medium 901 such as a magnetic disk, an optical disk, a magneto-optical disk, or a semiconductor memory, or writes information to the removable recording medium 901, for example.

(Removable Recording Medium 901)

The removable recording medium 901 is, for example, a DVD medium, a Blu-ray (registered trademark) medium, an HD-DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal, for example.

(External Connection Device 902)

The external connection device 902 is, for example, a printer, a portable music player, a digital camera, a digital video camera, an IC recorder, or the like.

(Communication Device 883)

The communication device 883 is a communication device for being connected to a network, and is, for example, a communication card for wired or wireless LAN, a Bluetooth (registered trademark), a wireless USB (WUSB), a router for optical communication, an asymmetric digital subscriber line (ADSL) router, one of various communication modems, or the like.

The hardware configuration example of the information processing terminal 10 and the information processing server 20 according to the embodiment of the present disclosure has been described with reference to FIG. 14.

4. Conclusion

As described above, in the case where the specific expression in a group including the user 40 is applicable, the information processing server 20 according to the embodiment of the present disclosure causes the information processing terminal 10 to execute information presentation including the specific expression to the user 40, using at least one of a sound or an image.

As a result, the information processing terminal 10 can present information using the specific expression used by the user 40. Furthermore, the user 40 can feel as if the information processing terminal 10 understands the specific expression used by the user 40 and presents information to the utterance of the user 40. Therefore, the new and improved information processing apparatus and information processing method capable of more smoothly communicating with the user can be provided.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

Furthermore, the steps in the processing of the information processing server 20 of the present specification do not necessarily need be processed chronologically in the order described as the flowcharts. For example, the steps regarding the processing of the information processing server 20 may be processed in an order different from the order described as the flowcharts or may be processed in parallel.

Note that following configurations also belong to the technical scope of the present disclosure.

(1)

An information processing apparatus including:

an output control unit configured to control information presentation to a user, in which, in a case where a specific expression in a group including the user is applicable regarding content of information to be presented, the output control unit causes the information presentation including the specific expression to be executed using at least one of a sound or an image.

(2)

The information processing apparatus according to (1), in which the output control unit determines whether or not the specific expression is applicable to the information to be presented on the basis of at least one input information of an input sound or an input image.

(3)

The information processing apparatus according to (2), in which, in a case where there is the specific expression applicable to a recognition target recognized on the basis of the image, the output control unit determines that the specific expression is applicable to the information to be presented.

(4)

The information processing apparatus according to (2) or (3), in which, in a case where there is the specific expression applicable to a linguistic expression recognized on the basis of the sound, the output control unit determines that the specific expression is applicable to the information to be presented.

(5)

The information processing apparatus according to any one of (1) to (4), in which, in a case where the image corresponding to the specific expression is registered, the output control unit causes the information presentation to be executed using the sound and the image.

(6)

The information processing apparatus according to (2), in which, in a case where the output control unit determines that the specific expression is not applied to the information to be presented on the basis of a plurality of detected users, the output control unit causes the information presentation to be executed using a general expression.

(7)

The information processing apparatus according to (6), in which, in a case where a user not belonging to the group is identified from the plurality of users, the output control unit determines that the specific expression is not applied to the information to be presented and causes the information presentation to be executed using a general expression.

(8)

The information processing apparatus according to (6) or (7), in which, in a case where it is estimated that the user does not understand the specific expression, the output control unit determines that the specific expression is not applied to the information to be presented and causes the information presentation to be executed using a general expression.

(9)

An information processing apparatus including:

a learning unit configured to learn a recognition target and a linguistic expression regarding the recognition target in association with each other, in which the linguistic expression includes a specific expression in a group including a user, and the learning unit learns the specific expression on the basis of at least one of a collected sound or a collected image.

(10)

The information processing apparatus according to (9), in which the specific expression includes a name for an object, and the learning unit learns the object recognized on the basis of the image and the name in association with each other.

(11)

The information processing apparatus according to (9), in which the learning unit learns an object recognized from the image and the specific expression used by the user for the object recognized from the sound in association with each other.

(12)

The information processing apparatus according to (10), in which the learning unit learns an object recognized from the image and the name corresponding to use of the object estimated from the image in association with each other.

(13)

The information processing apparatus according to (9), in which the learning unit learns an object recognized from the image and the specific expression used by the user for the object recognized from a conversation of the user in association with each other.

(14)

The information processing apparatus according to (9), in which the learning unit learns the specific expression recognized from the sound and an object recognized on the basis of record information regarding the user in association with each other.

(15)

The information processing apparatus according to (9), in which the learning unit learns a specific expression used by an utterer for an utterance target person and the utterance target person in association with each other.

(16)

The information processing apparatus according to (15), in which the learning unit re-evaluates the association between the utterance target person and the specific expression according to a characteristic of the utterance target person.

(17)

The information processing apparatus according to (9), in which the learning unit sets reliability of the specific expression to be used for the recognition target on the basis of a number of times the recognition target is recognized.

(18)

The information processing apparatus according to any one of (9), to (17), in which the specific expression includes at least one of a name, an adjective expression, or an operation expression.

(19)

An information processing method executed by a processor, the method including:

controlling information presentation to a user; and in a case where a specific expression in a group including the user is applicable regarding content of information to be presented, causing the information presentation including the specific expression to be executed using at least one of a sound or an image.

(20)

An information processing method executed by a processor, the method including:

learning a recognition target and a linguistic expression regarding the recognition target in association with each other;

the linguistic expression including a specific expression in a group including a user; and learning the specific expression on the basis of at least one of a collected sound or a collected image.

REFERENCE SIGNS LIST

10 Information processing terminal
20 Information processing server
30 Network
110 Display unit
120 Sound output unit
130 Sound input unit
140 Imaging unit
150 Sensor input unit
160 Control unit
170 Server communication unit
210 Communication unit
220 Input analysis unit
230 Learning unit
240 Storage unit
250 Output control unit

The invention claimed is:

1. An information processing apparatus, comprising:
at least one processor configured to:
acquire a sound of a user utterance associated with a recognition target, wherein the user utterance is an utterance of a first user of a first group of users;
analyze the acquired sound of the user utterance in association with the recognition target;
acquire a specific expression for the recognition target based on the analysis of the acquired sound of the user utterance, wherein the specific expression is specific to the first group of users; and
control presentation of specific information including the acquired specific expression based on the acquired specific expression is applicable to content of the specific information, wherein the specific information is presented by at least one of a specific sound or a specific image.

2. The information processing apparatus according to claim 1, wherein the at least one processor is further configured to determine the applicability of the specific expression for the specific information.

3. The information processing apparatus according to claim 2, wherein the at least one processor is further configured to:
acquire an image of the recognition target;
recognize the recognition target based on the acquired image of the recognition target; and
determine that the specific expression is applicable to the specific information based on the specific expression is applicable to the recognized recognition target.

4. The information processing apparatus according to claim 2, wherein the at least one processor is further configured to:
recognize a linguistic expression based on the acquired sound of the user utterance; and
determine that the specific expression is applicable to the specific information based on the specific expression is applicable to the recognized linguistic expression.

5. The information processing apparatus according to claim 2, wherein the at least one processor is further configured to:
determine that the specific expression is not applicable to the specific information based on detection of a second group of users; and
control the presentation of the specific information including a general expression based on the determination that the specific expression is not applicable to the specific information.

6. The information processing apparatus according to claim 5, wherein the at least one processor is further configured to:
determine that the specific expression is not applicable to the specific information based on detection of a second user, wherein
the second user belongs to the second group of users, and
the specific information is not specific to the second group of users; and
control the presentation of the specific information including the general expression based on the determination that the specific expression is not applicable to the specific information.

7. The information processing apparatus according to claim 5, wherein the at least one processor is further configured to:
estimate that a second user of the second group of users does not understand the specific expression;
determine that the specific expression is not applicable to the specific information based on the estimation; and
control the presentation of the specific information including the general expression based on the determination that the specific expression is not applicable to the specific information.

8. The information processing apparatus according to claim 1, wherein
the at least one processor is further configured to control the presentation of the specific information based on an image of the recognition target is registered in a database corresponding to the specific expression, and
the specific information is presented by the specific sound and the specific image.

9. An information processing apparatus, comprising:
at least one processor configured to:
analyze sound information in association with a recognition target, wherein
the sound information includes information of a sound of a user utterance associated with the recognition target, and
the user utterance is an utterance of a user of a group of users;
acquire a specific expression for the recognition target based on the analysis of the sound information, wherein the specific expression is specific to the group of users; and
learn the recognition target and a linguistic expression in association with the recognition target, wherein the linguistic expression includes the acquired specific expression.

10. The information processing apparatus according to claim 9, wherein
the recognition target is an object,
the specific expression includes a name of the object,
the at least one processor is further configured to learn object and the name of the object in association with the object, and
the object is recognized from an image of the object.

11. The information processing apparatus according to claim 10, wherein the at least one processor is further configured to:
learn the name of the object corresponding to use of the object; and
estimate the use of the object from the image of the object.

12. The information processing apparatus according to claim 9, wherein
the at least one processor is further configured to learn an object and the specific expression in association with the object,
the object is recognized from an image of the recognition target,
the specific expression is recognized from the sound of the user utterance, and
the specific expression is used by the user for the object in the user utterance.

13. The information processing apparatus according to claim 9, wherein
the at least one processor is further configured to learn an object and the specific expression in association with the object,
the object is recognized from an image of the recognition target,
the specific expression is recognized from a conversation of the user, and
the specific expression is used by the user for the object in the conversation of the user.

14. The information processing apparatus according to claim 9, wherein
the at least one processor is further configured to learn the specific expression and an object in association with the specific expression,
the specific expression is recognized from the sound of the user utterance,
the object is recognized from record information recorded in a database, and
the record information is associated with the user.

15. The information processing apparatus according to claim 9, wherein
the at least one processor is further configured to learn the specific expression and an utterance target person in association with the specific expression, and
the specific expression is used by the user for the utterance target person.

16. The information processing apparatus according to claim 15, wherein the at least one processor is further configured to re-evaluate the association between the utterance target person and the specific expression based on a characteristic of the utterance target person.

17. The information processing apparatus according to claim 9, wherein the at least one processor is further configured to set a reliability of the specific expression for the association of the specific expression with the recognition target, based on a number of times of recognition of the recognition target.

18. The information processing apparatus according to claim 9, wherein the specific expression includes at least one of a name, an adjective expression, or an operation expression.

19. An information processing method, comprising:
acquiring a sound of a user utterance associated with a recognition target, wherein the user utterance is an utterance of a user of a group of users;
analyzing the acquired sound of the user utterance in association with the recognition target;
acquiring a specific expression for the recognition target based on the analysis of the acquired sound of the user utterance, wherein the specific expression is specific to the group of users; and
controlling presentation of specific information including the acquired specific expression based on the acquired specific expression is applicable to content of the specific information, wherein the specific information is presented by at least one of a specific sound or a specific image.

20. An information processing method, comprising:
analyzing sound information in association with a recognition target, wherein
the sound information includes information of a sound of a user utterance associated with the recognition target, and
the user utterance is an utterance of a user of a group of users;
acquiring a specific expression for the recognition target based on the analysis of the sound information, wherein the specific expression is specific to the group of users; and
learning the recognition target and a linguistic expression in association with the recognition target, wherein the linguistic expression includes the acquired specific expression.

* * * * *